US012598657B2

(12) United States Patent
Wang et al.

(10) Patent No.: US 12,598,657 B2
(45) Date of Patent: Apr. 7, 2026

(54) PROJECTION CONNECTION CONTROL METHOD AND ELECTRONIC DEVICE

(71) Applicant: Honor Device Co., Ltd., Shenzhen (CN)

(72) Inventors: Hao Wang, Shenzhen (CN); Xun Cao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 721 days.

(21) Appl. No.: 17/758,280

(22) PCT Filed: Mar. 2, 2021

(86) PCT No.: PCT/CN2021/078686
§ 371 (c)(1),
(2) Date: Jun. 30, 2022

(87) PCT Pub. No.: WO2021/175214
PCT Pub. Date: Sep. 10, 2021

(65) Prior Publication Data
US 2023/0039861 A1     Feb. 9, 2023

(30) Foreign Application Priority Data
Mar. 5, 2020     (CN) .......................... 202010146445.6

(51) Int. Cl.
*H04W 76/14*          (2018.01)
(52) U.S. Cl.
CPC .................................. *H04W 76/14* (2018.02)

(58) Field of Classification Search
CPC ................ G06F 3/0488; G06F 3/1454; G09G 2370/042; G09G 2370/16; G09G 3/002;
(Continued)

(56) References Cited

U.S. PATENT DOCUMENTS 9,317,245 B2     4/2016   Yoon et al.
2016/0364574 A1   12/2016  Scott et al.
(Continued)

FOREIGN PATENT DOCUMENTS

CN          107493484 A        12/2017
CN          108024306 A        5/2018
(Continued)

OTHER PUBLICATIONS

Epson, "EF11 User's Guide", https://files.support.epson.com/docid/cpd5/cpd59707.pdf, copyright Oct. 2020, Epson America, Inc., CPD-59707, 136 pages.

*Primary Examiner* — Rong Le
(74) *Attorney, Agent, or Firm* — Slater Matsil, LLP

(57) ABSTRACT

This application provides a projection connection control method and an electronic device. The method includes: A transmit end device obtains preemption capability information from a receive end device, where the preemption capability information indicates whether the receive end device supports projection connection preemption; and when the receive end device supports projection connection preemption, the transmit end device sends first configuration information to the receive end device in response to a user instruction, so as to configure the receive end device to not support projection connection preemption.

20 Claims, 21 Drawing Sheets

(58) Field of Classification Search
CPC ....... H04N 21/43615; H04N 21/43637; H04N
21/643; H04W 76/14
See application file for complete search history.

(56) References Cited

U.S. PATENT DOCUMENTS

| | | | |
|---|---|---|---|
| 2018/0197501 A1* | 7/2018 | Veeramani ....... | H04N 21/43635 |
| 2019/0075607 A1* | 3/2019 | Park ..................... | H04W 76/14 |
| 2019/0357214 A1* | 11/2019 | Kurian .................. | H04W 16/04 |
| 2019/0373439 A1* | 12/2019 | Abouelseoud ........ | H04W 8/005 |
| 2022/0279062 A1 | 9/2022 | Fei | |
| 2023/0029382 A1* | 1/2023 | Yoden ............. | H04N 21/47217 |

FOREIGN PATENT DOCUMENTS

| | | |
|---|---|---|
| CN | 108664229 A | 10/2018 |
| CN | 108702414 A | 10/2018 |
| CN | 108920116 A | 11/2018 |
| CN | 109194992 A | 1/2019 |
| CN | 110505516 A | 11/2019 |
| CN | 110597473 A | 12/2019 |
| CN | 112114761 A | 12/2020 |
| KR | 20140122967 | 10/2014 |

* cited by examiner

Electronic device A

Electronic device B

Electronic device C

Wireless projection
List of available devices

HUAWEI-0C8C24DF48A4

Television in the
living room

Smart screen V65

Transmit end
device

Access point
device

Receive end
device

Discovery packet
(preemption capability
information and
connection status
information)

Broadcast and multicast:
Discovery packet

Obtain the preemption capability
information and the connection
status information
from the discovery packet Wireless projection List of available devices Device A (in use and unpreemptable)
Support projection in computer mode and mobile phone mode Device B (in use and pre
Support projection in co
mode and mobile phone Device C (idle)
Support projection in co
mode and mobile phone

TO

CONT.
FROM

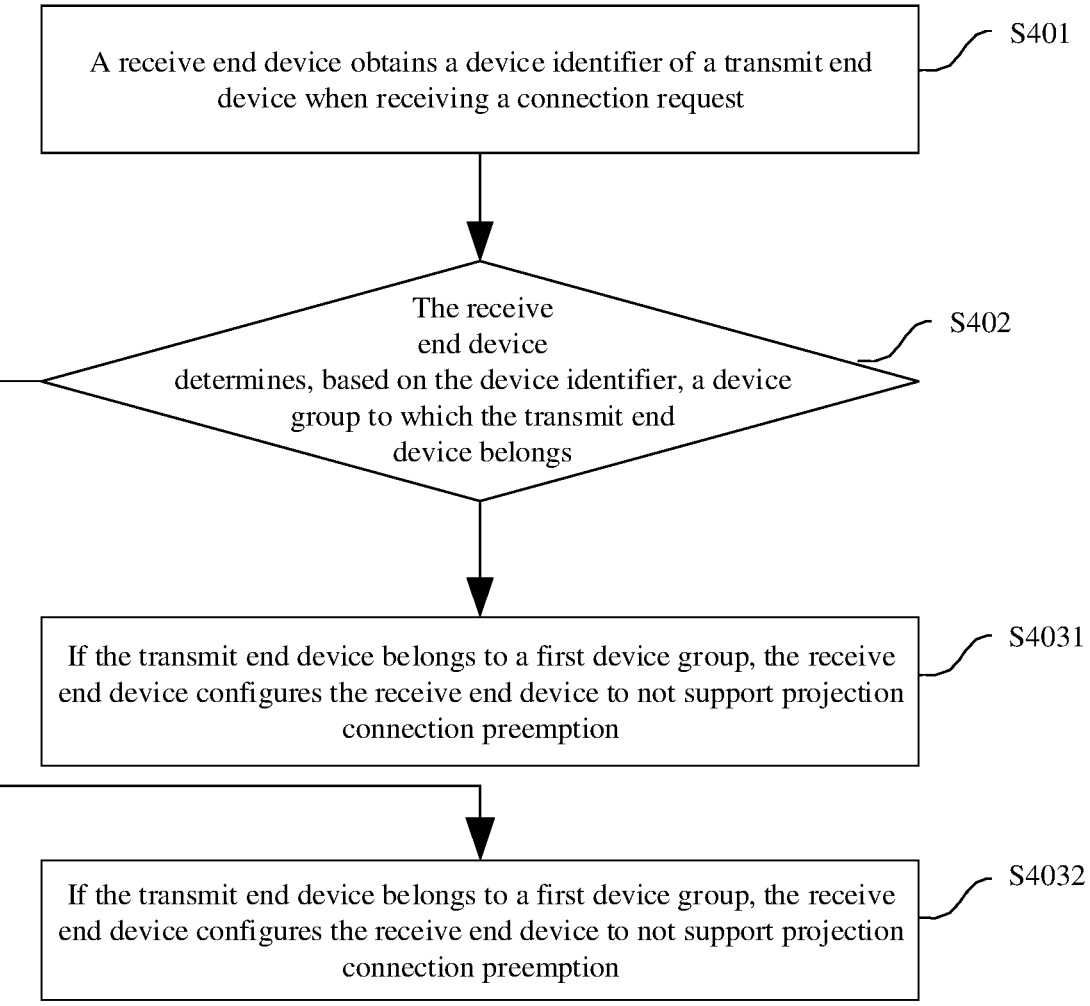

A receive end device obtains a device identifier of a transmit end device when receiving a connection request ⌐ S401

The receive end device determines, based on the device identifier, a device group to which the transmit end device belongs ⌐ S402

If the transmit end device belongs to a first device group, the receive end device configures the receive end device to not support projection connection preemption ⌐ S4031

If the transmit end device belongs to a first device group, the receive end device configures the receive end device to not support projection connection preemption ⌐ S4032

FIG. 20

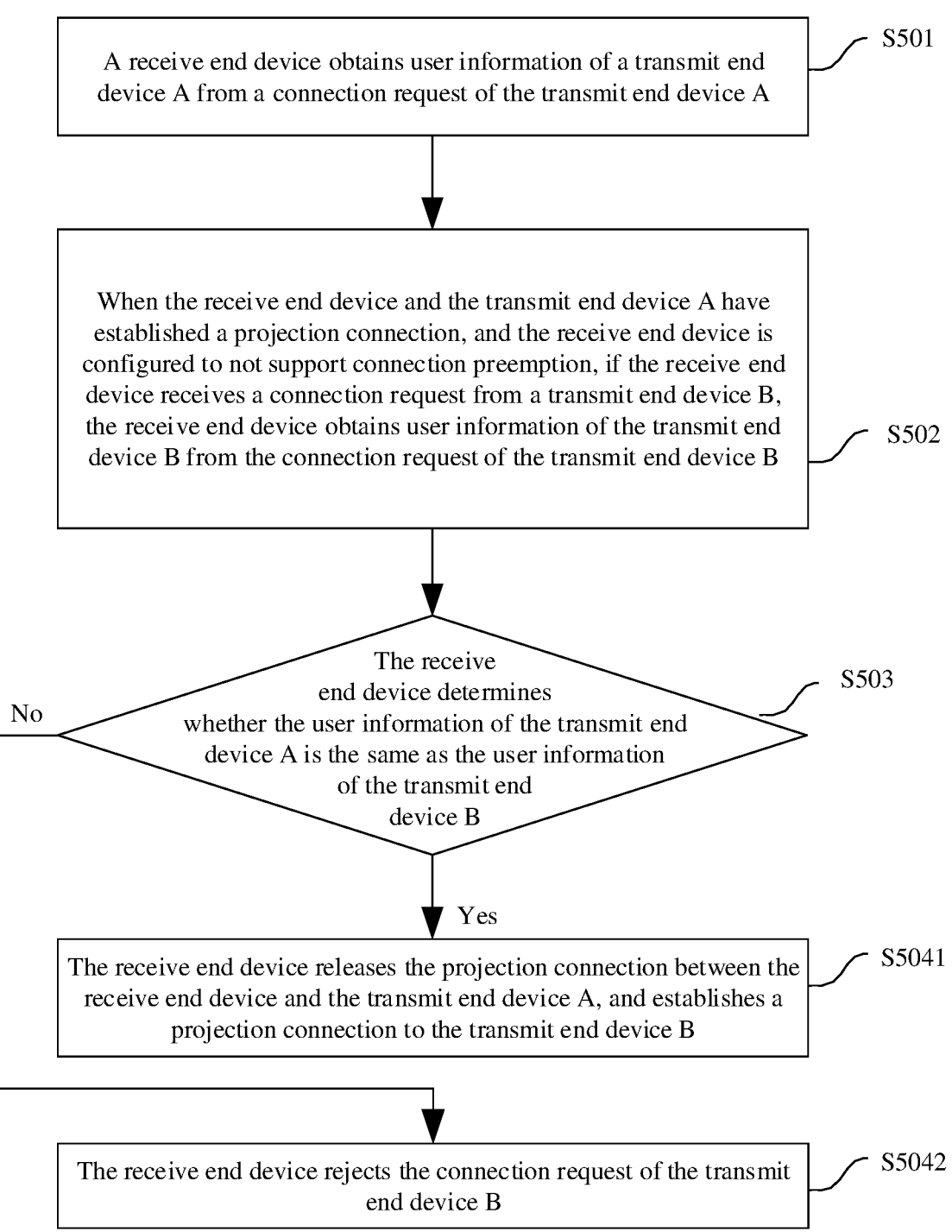

A receive end device obtains user information of a transmit end device A from a connection request of the transmit end device A    S501

When the receive end device and the transmit end device A have established a projection connection, and the receive end device is configured to not support connection preemption, if the receive end device receives a connection request from a transmit end device B, the receive end device obtains user information of the transmit end device B from the connection request of the transmit end device B    S502

The receive end device determines whether the user information of the transmit end device A is the same as the user information of the transmit end device B    S503

No

Yes

The receive end device releases the projection connection between the receive end device and the transmit end device A, and establishes a projection connection to the transmit end device B    S5041

The receive end device rejects the connection request of the transmit end device B    S5042

FIG. 21

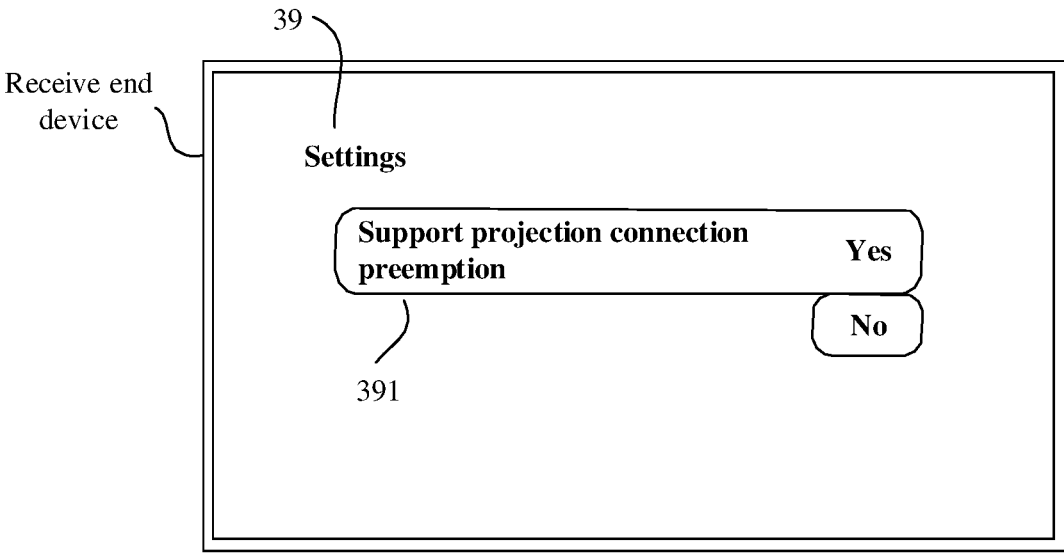
Receive end device
39
Settings
Support projection connection preemption    Yes
No
391
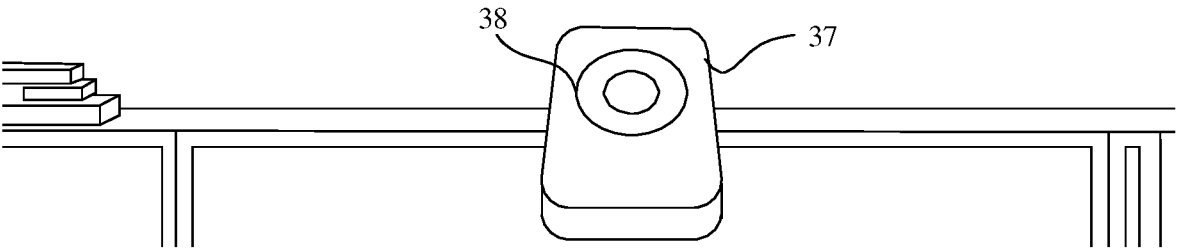
38     37
FIG. 24
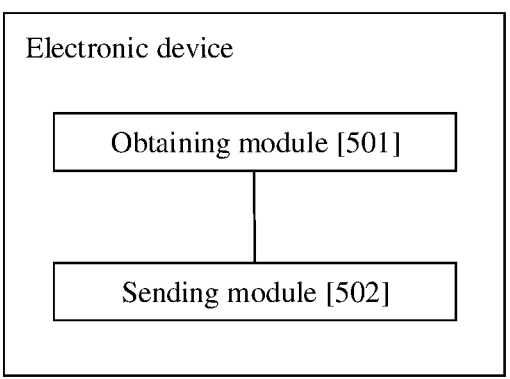
Electronic device
Obtaining module [501]
Sending module [502]
FIG. 25

PROJECTION CONNECTION CONTROL METHOD AND ELECTRONIC DEVICE

CROSS-REFERENCE TO RELATED APPLICATIONS

This application is a National Stage of International Application No. PCT/CN2021/078686, filed Mar. 2, 2021, which claims priority to Chinese Patent Application No. 202010146445.6, filed Mar. 5, 2020, both of which are hereby incorporated by reference in their entireties.

TECHNICAL FIELD

This application relates to the field of streaming media transmission technologies, and in particular, to a projection connection control method and an electronic device.

BACKGROUND

Streaming media projection, which may also be referred to as projection, delivery, or the like, refers to a technology in which streaming media content such as a screen image, a video, an audio, or a picture that is being played on an electronic device (for example, a smartphone, a tablet computer, or a laptop computer) is projected onto another electronic device (for example, a smart TV, a smart speaker, or a projector) through a network connection by using a related transmission protocol, so that the another electronic device can play the same content in real time.

Transmission protocols used to implement streaming media projection include Miracast, the digital living network alliance (digital living network alliance, DLNA), AirPlay (AirPlay), and other private projection protocols. An electronic device generally supports projection connection preemption during screen projection. Projection connection preemption means that when a receive end device A has established a projection connection to a transmit end device B, another transmit end device C may force a disconnection between the receive end device A and the transmit end device B, so that the transmit end device B is disconnected, and the transmit end device C establishes a connection to the receive end device A.

Currently, a preemption logic of a projection scenario is as follows: As long as a receive end device supports a preemption function, any transmit end device can initiate projection connection preemption for the receive end device, to enable the receive end device to release an original projection connection, and to establish a new projection connection to the transmit end device that initiates projection connection preemption. This preemption logic is defective in design, and is easy to be used maliciously, causing interference to a normally used preemption connection.

SUMMARY

This application provides a projection connection control method and an electronic device, so as to optimize a preemption logic in a streaming media projection scenario and improve user experience.

To achieve the foregoing objective, the following technical solutions are used in the embodiments of this application:

According to a first aspect, this application provides a projection connection control method, and the method may be applied to a transmit end device in streaming media projection. The method may include: The transmit end device obtains preemption capability information from a receive end device, where the preemption capability information indicates whether the receive end device supports projection connection preemption; and when the receive end device supports projection connection preemption, the transmit end device sends first configuration information to the receive end device in response to a user instruction. The first configuration information indicates the receive end device to configure the receive end device to not support projection connection preemption.

According to the method provided in this embodiment of this application, the transmit end device can obtain a preemption capability of the receive end device, so that the transmit end device can dynamically configure the preemption capability of the receive end device based on the preemption capability of the receive end device and a user requirement. For example, if the user does not want a projection connection to be preempted, the transmit end device may configure the receive end device to not support preemption, so as to avoid interference or interruption of content that the user wishes to deliver on the receive end device. Therefore, the method provided in this embodiment of this application optimizes a preemption logic of a streaming media projection scenario, and improves user experience.

With reference to the first aspect, in a possible design manner, when the receive end device supports projection connection preemption, the transmit end device sends a connection request to the receive end device in response to a first user instruction. The connection request is used by the transmit end device to establish a projection connection to the receive end device, and the connection request carries the first configuration information. In this way, when the receive end device supports projection connection preemption, the transmit end device may configure the receive end device to not support preemption while sending the connection request to the receive end device, so that any subsequent request for projection connection preemption will be rejected by the receive end device, thereby avoiding interference or interruption of content delivered by the user on the receive end device, and improving user experience.

With reference to the first aspect, in a possible design manner, when the receive end device supports projection connection preemption, and when the transmit end device and the receive end device have established a projection connection, the transmit end device sends the first configuration information to the receive end device in response to a second user instruction. In this way, when the receive end device supports projection connection preemption, the transmit end device may configure, at any time, the receive end device to not support preemption after establishing the projection connection to the receive end device, so that any subsequent request for projection connection preemption will be rejected by the receive end device, thereby avoiding interference or interruption of content delivered by the user on the receive end device, and improving user experience.

With reference to the first aspect, in a possible design manner, when the receive end device does not support projection connection preemption, the transmit end device sends second configuration information to the receive end device in response to a third user instruction. The second configuration information indicates the receive end device to configure the receive end device to support projection connection preemption. In this way, if the content that the user needs to deliver has already displayed on the receive end device, the transmit end device may configure the receive end device to support preemption, so that another transmit end device can establish a connection to the transmit end device, and different streaming media content from a plurality of transmit end devices can be switched seamlessly on one receive end device, thereby improving user experience.

With reference to the first aspect, in a possible design manner, the transmit end device receives a beacon frame broadcast by the receive end device, where the beacon frame carries the preemption capability information. In this way, in a device discovery stage, the transmit end device may obtain the preemption capability information from the beacon frame of the receive end device, and display the preemption capability information to the user, so as to instruct the user to send a corresponding instruction, thereby improving user experience.

With reference to the first aspect, in a possible design manner, the transmit end device sends a probe request to the receive end device; and the transmit end device receives a probe response from the receive end device. The probe response is sent by the receive end device in response to the probe request, and the probe response carries the preemption capability information. In this way, in the device discovery stage, the transmit end device may obtain the preemption capability information from the probe response of the receive end device, and display the preemption capability information to the user, so as to instruct the user to send a corresponding instruction, thereby improving user experience.

With reference to the first aspect, in a possible design manner, the transmit end device receives a discovery packet broadcast or multicast by an access point device. The discovery packet is sent by the receive end device to the access point device, and the discovery packet carries the preemption capability information. In this way, in the device discovery stage, the transmit end device may obtain the preemption capability information from the discovery packet of the receive end device, and display the preemption capability information to the user, so as to instruct the user to send a corresponding instruction, thereby improving user experience.

With reference to the first aspect, in a possible design manner, the transmit end device obtains connection status information of the receive end device. The connection status information indicates whether a projection connection is currently established by the receive end device. In this way, the transmit end device may display the connection status of the receive end device to the user, so as to instruct the user to send a corresponding instruction, thereby improving user experience.

According to a second aspect, this application provides a projection connection control method, and the method may be applied to a receive end device in streaming media projection. The method may include: The receive end device sends preemption capability information to a transmit end device, where the preemption capability information indicates whether the receive end device supports projection connection preemption; the receive end device receives first configuration information from the transmit end device, where the first configuration information is sent by the transmit end device in response to a user instruction when the transmit end device determines, based on the preemption capability information, that the receive end device supports projection connection preemption; and the receive end device configures, based on the first configuration information, the receive end device to not support projection connection preemption.

According to the method provided in this embodiment of this application, the receive end device may notify the transmit end device of a preemption capability of the receive end device, so that the transmit end device can dynamically configure the preemption capability of the receive end device based on the preemption capability of the receive end device and a user requirement. For example, if the user does not want a projection connection to be preempted, the transmit end device may configure the receive end device to not support preemption, so as to avoid interference or interruption of content that the user wishes to deliver on the receive end device. Therefore, the method provided in this embodiment of this application optimizes a preemption logic of a streaming media projection scenario, and improves user experience.

With reference to the second aspect, in a possible design manner, the receive end device receives a connection request from the transmit end device. The connection request is sent by the transmit end device in response to a first user instruction, and the connection request carries the first configuration information.

With reference to the second aspect, in a possible design manner, when the receive end device supports projection connection preemption, the receive end device establishes a projection connection to the transmit end device in response to the connection request, and configures, based on the first configuration information, the receive end device to not support projection connection preemption.

In this way, when the receive end device supports projection connection preemption, the transmit end device may configure the receive end device to not support preemption while sending the connection request to the receive end device, so that any subsequent request for projection connection preemption will be rejected by the receive end device, thereby avoiding interference or interruption of content delivered by the user on the receive end device, and improving user experience.

With reference to the second aspect, in a possible design manner, when the transmit end device and the receive end device have established a projection connection, the receive end device receives the first configuration information sent by the transmit end device in response to a second user instruction. In this way, when the receive end device supports projection connection preemption, the transmit end device may configure, at any time, the receive end device to not support preemption after establishing the projection connection to the receive end device, so that any subsequent request for projection connection preemption will be rejected by the receive end device, thereby avoiding interference or interruption of content delivered by the user on the receive end device, and improving user experience.

With reference to the second aspect, in a possible design manner, the receive end device receives second configuration information from the transmit end device, where the second configuration information is sent in response to a third user instruction when the transmit end device and the receive end device have established a projection connection; and the receive end device configures, based on the second configuration information, the receive end device to support projection connection preemption. In this way, if the content that the user needs to deliver has already displayed on the receive end device, the transmit end device may configure the receive end device to support preemption, so that another transmit end device can establish a connection to the transmit end device, and different streaming media content from a plurality of transmit end devices can be switched seamlessly on one receive end device, thereby improving user experience.

With reference to the second aspect, in a possible design manner, the receive end device broadcasts a beacon frame to the transmit end device, where the beacon frame carries the preemption capability information. In this way, in a device discovery stage, the transmit end device may obtain the preemption capability information from the beacon frame of the receive end device, and display the preemption capability information to the user, so as to instruct the user to send a corresponding instruction, thereby improving user experience.

With reference to the second aspect, in a possible design manner, the receive end device receives a probe request from the transmit end device; and the receive end device sends a probe response to the transmit end device in response to the probe request, where the probe response carries the preemption capability information. In this way, in the device discovery stage, the transmit end device may obtain the preemption capability information from the probe response of the receive end device, and display the preemption capability information to the user, so as to instruct the user to send a corresponding instruction, thereby improving user experience.

With reference to the second aspect, in a possible design manner, the receive end device sends a discovery packet to an access point device, so that the access point device broadcasts or multicasts the discovery packet to the transmit end device. The discovery packet carries the preemption capability information. In this way, in the device discovery stage, the transmit end device may obtain the preemption capability information from the discovery packet of the receive end device, and display the preemption capability information to the user, so as to instruct the user to send a corresponding instruction, thereby improving user experience.

With reference to the second aspect, in a possible design manner, the receive end device sends connection status information to the transmit end device, where the connection status information indicates whether a projection connection is currently established by the receive end device. In this way, the transmit end device may display the connection status of the receive end device to the user, so as to instruct the user to send a corresponding instruction, thereby improving user experience.

With reference to the second aspect, in a possible design manner, when receiving the connection request, the receive end device obtains a device identifier of the transmit end device; the receive end device determines, based on the device identifier, a device group to which the transmit end device belongs; and if the transmit end device belongs to a first device group, the receive end device configures the receive end device to not support projection connection preemption; or if the transmit end device does not belong to the first device group, the receive end device configures the receive end device to support projection connection preemption. In this way, the receive end device may determine, by using a blacklist/whitelist mechanism, whether the transmit end device that initiates the connection request belongs to a group corresponding to the whitelist. If the transmit end device belongs to the group corresponding to the whitelist, the receive end device configures the receive end device to not support preemption, so that the projection connection between the transmit end device and the receive end device is not preempted or interfered with. If the transmit end device does not belong to the group corresponding to the whitelist, the receive end device configures the receive end device to support preemption, so that another transmit end device can reasonably initiate projection connection preemption, and different streaming media content from a plurality of transmit end devices can be switched seamlessly on one receive end device, thereby improving user experience.

According to a third aspect, this application provides an electronic device. The electronic device includes a display, a memory, and one or more processors. The display, the memory, and the processor are coupled. The memory is configured to store computer program code. The computer program code includes computer instructions. When the processor executes the computer instructions, the electronic device executes the method according to any one of the first aspect and the possible design manners thereof.

According to a fourth aspect, this application provides a chip system. The chip system is applied to an electronic device including a display. The chip system includes one or more interface circuits and one or more processors. The interface circuit is interconnected with the processor through a line. The interface circuit is configured to receive a signal from a memory of the electronic device, and send the signal to the processor, where the signal includes a computer instruction stored in the memory. When the processor executes the computer instruction, the electronic device performs the method according to any one of the first aspect and the possible design manners thereof, or the method according to any one of the second aspect and the possible design manners thereof.

According to a fifth aspect, this application provides a computer storage medium. The computer storage medium includes computer instructions, and when the computer instructions are run on an electronic device, the electronic device is enabled to execute the method according to any one of the first aspect and the possible design manners thereof, or the second aspect and the possible design manners thereof.

According to a sixth aspect, this application provides a computer program product. When the computer program product runs on a computer, the computer is enabled to execute the method according to any one of the first aspect and the possible design manners thereof, or the second aspect and the possible design manners thereof.

It may be understood that for beneficial effects that can be achieved by the foregoing provided electronic device in the third aspect, the chip system in the fourth aspect, the computer storage medium in the fifth aspect, and the computer program product in the sixth aspect, reference may be made to the beneficial effects of any one of the first aspect and the possible design manners of the first aspect, and the second aspect and the possible design manners of the second aspect. Details are not described herein again.

BRIEF DESCRIPTION OF THE DRAWINGS

FIG. 20 is a schematic diagram in which a receive end device configures a preemption capability of the receive end device according to an embodiment of this application;

FIG. 21 is a flowchart in which a receive end device allows a transmit end device of a same user to initiate projection preemption;

FIG. 24 is a schematic diagram of controlling a receive end device by using a remote control device;

FIG. 25 is a schematic diagram of modules of an electronic device according to an embodiment of this application;

DETAILED DESCRIPTION OF ILLUSTRATIVE EMBODIMENTS

In the following, terms "first" and "second" are merely used for description purposes, and shall not be understood as an indication or implication of relative importance or implicitly indicate the number of indicated technical features. Therefore, a feature defined as "first" or "second" may explicitly or implicitly include one or more of the features. In the description of the embodiments, unless otherwise stated, "a plurality of" means two or more.

The following first describes an application scenario of the embodiments of this application with reference to the accompanying drawings.

Figure 1:
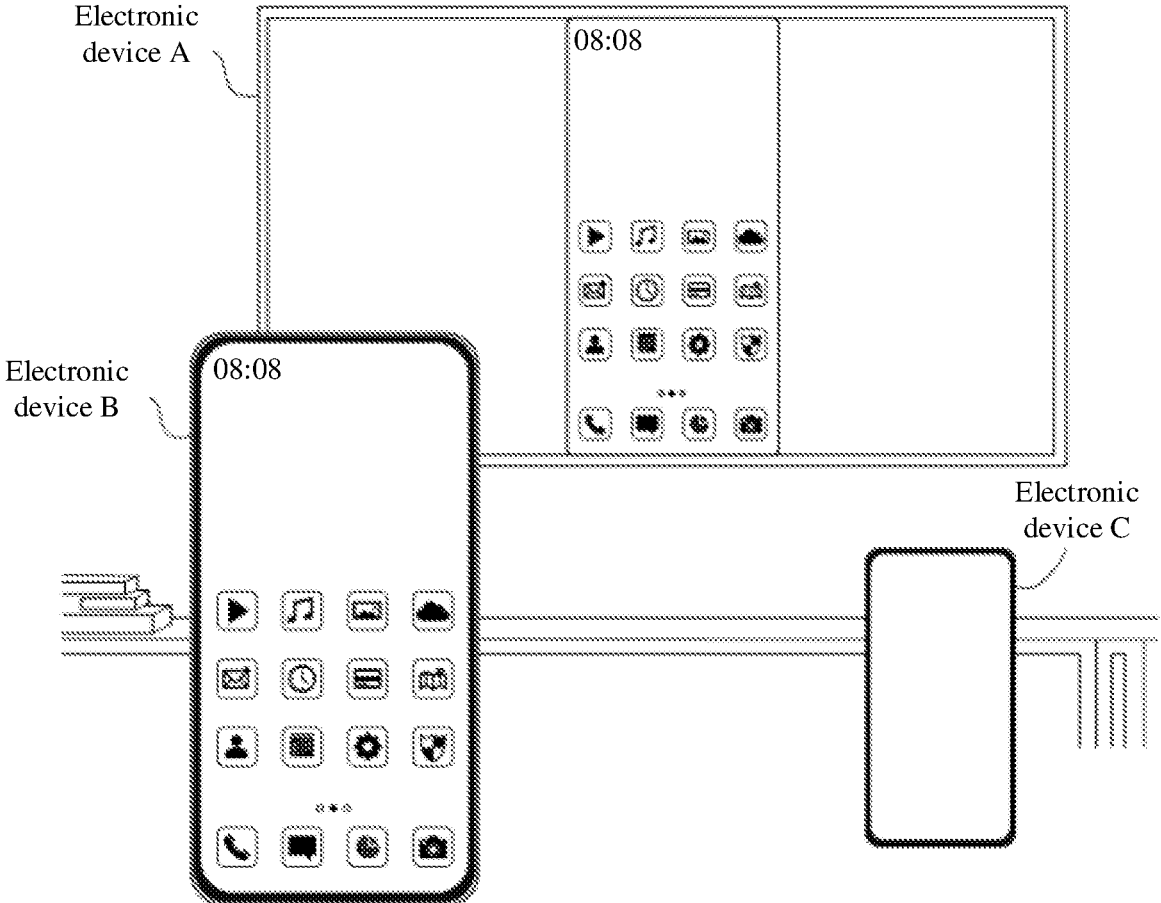
FIG. 1 is a schematic diagram of a streaming media projection scenario.

The method provided in the embodiments of this application may be applied to a streaming media projection scenario. Refer to FIG. 1. The streaming media projection scenario may involve a plurality of electronic devices, for example, an electronic device A, an electronic device B, and an electronic device C in FIG. 1. The electronic devices may be classified into a transmit end device and a receive end device based on a direction of delivering streaming media from one electronic device to another electronic device. The transmit end device may also be referred to as a source end, and refers to a party that sends streaming media in streaming media projection, for example, the electronic device B and the electronic device C in FIG. 1. The receive end device may also be referred to as a sink end, and refers to a party that receives the streaming media in the streaming media projection, for example, the electronic device A in FIG. 1. Therefore, in a projection connection, the transmit end device can deliver, to the receive end device through a wireless or wired network connection, content such as a screen image, a video, an audio, or a picture that is being played by the transmit end device, so that the receive end device can play, in real time, the streaming media content received by the receive end device.

It should be noted that the transmit end device and the receive end device in the streaming media projection scenario are logically determined based on the streaming media projection direction. Therefore, based on different streaming media projection directions, an electronic device may be used as a transmit end device or may be used as a receive end device. For example, for the electronic device A and the electronic device B, when the electronic device A projects streaming media content onto the electronic device B, the electronic device A is a transmit end device, and the electronic device B is a receive end device. On the contrary, when the electronic device B projects streaming media content onto the electronic device A, the electronic device B is a transmit end device, and the electronic device A is a receive end device. For ease of describing the technical solutions in the embodiments of this application, in this application, the electronic device A is used as a receive end device, and the electronic device B and the electronic device C are used as transmit end devices.

It should be noted that, as shown in FIG. 1, in the streaming media projection scenario, one receive end device can establish a projection connection to only one transmit end device at a same moment. For example, when the electronic device A and the electronic device B establish a projection connection, the electronic device A cannot simultaneously establish a projection connection to the electronic device C. On the contrary, when the electronic device A and the electronic device C establish a projection connection, the electronic device A cannot simultaneously establish a projection connection to the electronic device B.

Figure 2:
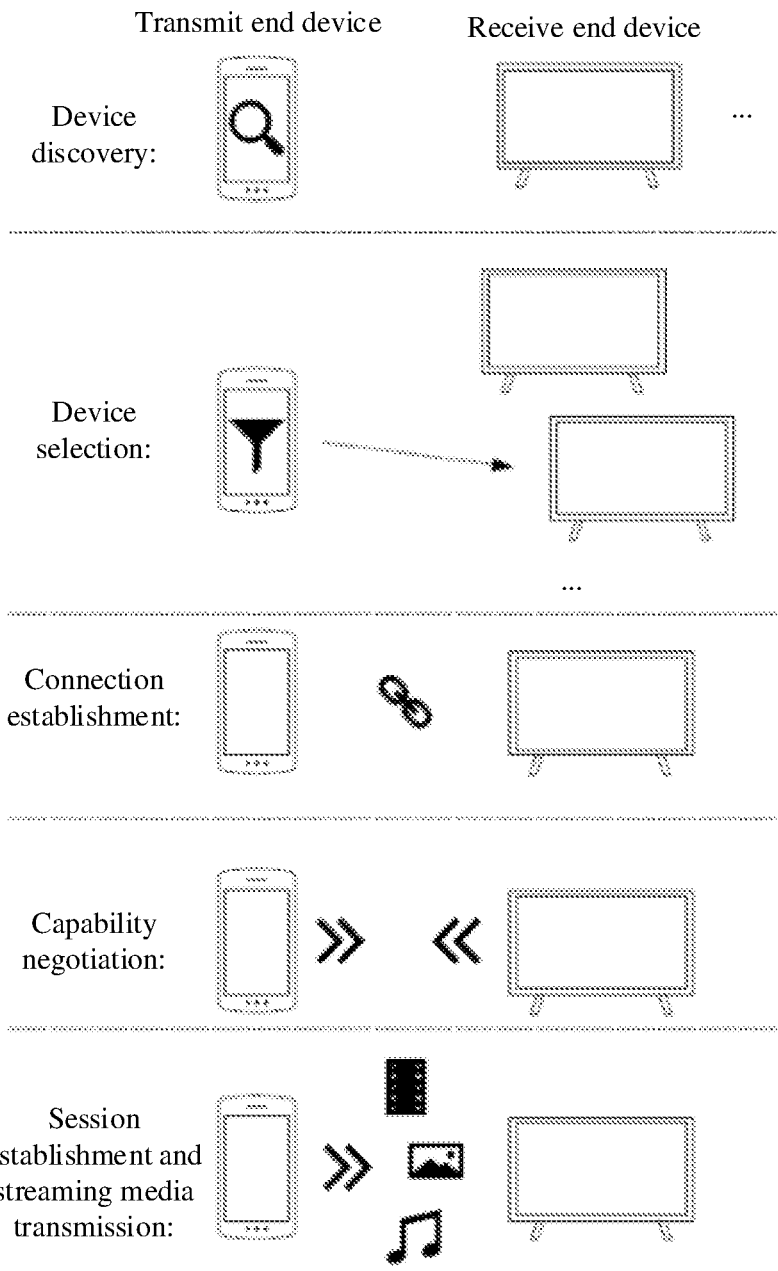
FIG. 2 is a schematic diagram of establishing a projection connection between a receive end device and a transmit end device.

Refer to FIG. 2. A process of establishing a projection connection between a receive end device and a transmit end device may include the following stages.

Stage (1): Device discovery. The transmit end device searches for a receive end device that supports a projection connection near the transmit end device, and may generate, based on a search result, a list of available devices that include discovered receive end devices.

For example, the transmit end device may discover the receive end device in a passive scanning manner. In a possible implementation, the receive end device periodically broadcasts a beacon frame (Beacon Frame) in a network to notify the existence of the receive end device. The transmit end device monitors the beacon frame of the receive end device to discover the receive end device. Another possible implementation is as follows: The receive end device sends, in a multicast or broadcast manner in a local area network by using an access point (access point, AP), a discovery packet that is used to notify the existence of the receive end device. If the transmit end device also accesses the local area network, the transmit end device can discover the receive end device.

For example, the transmit end device may alternatively discover the receive end device in an active scanning manner. In a possible implementation, the transmit end device sends a probe request (Probe Request) on a wireless channel, so as to detect a receive end device that exists nearby. After receiving the probe request (Probe Request), the receive end device sends a probe response (Probe Response) to notify the transmit end device of the existence of the receive end device. In this way, the transmit end device can discover the receive end device.

Stage (2): Device selection. The transmit end device may display the list of available devices to the user, and the user may determine, based on a requirement, whether to select a receive end device from the list of available devices for pairing.

Figure 3:
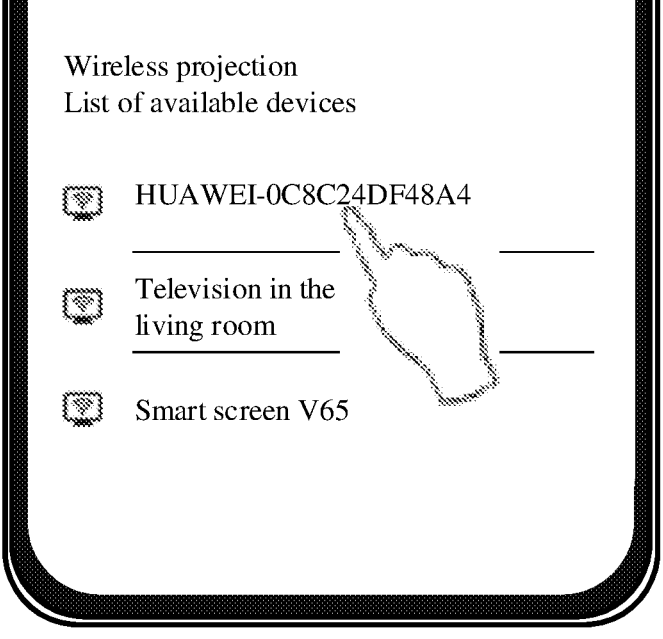
FIG. 3 is a schematic diagram in which a transmit end device displays a list of available devices to a user.

FIG. 3 is a schematic diagram in which a transmit end device displays a list of available devices to a user. As shown in FIG. 3, generally, the transmit end device displays the list of available devices on a display. The list of available devices includes device identifiers of all receive end devices discovered by the transmit end device. The device identifier may be a device name, a device number, a service set identifier (service set identifier, SSID), a media access control address (media access control address, MAC address), an internet protocol address (internet protocol address, IP address), a combination thereof, and the like of the receive end device. The device name may be specifically a device type of the receive end device, a manufacturer name, another user-defined name, or the like. For example, in FIG. 3, a device identifier of an available device is displayed as "smart screen V65" by using a device model, a device identifier of another available device is displayed as "HUAWEI-0C8C24DF48A4" by using a combination of a manufacturer name and a MAC address, and a device identifier of another available device is displayed as "living room TV" by using a user-defined name. It should be understood that an implementation of the device identifier is not specifically limited in the embodiments of this application, and any information that can enable the user to associate the receive end device displayed in the list of available devices with a real receive end device in reality can be used as a device identifier.

Based on the list of available devices shown in FIG. 3, the user may select, in a manner of tapping a device identifier or operating a button on the display, a receive end device that the user wants to connect, so that the transmit end device sends a projection connection request to the receive end device that the user wants to connect.

Stage (3): Establish a connection: Establish, between the transmit end device and the receive end device, a connection corresponding to a projection protocol of the transmit end device and the receive end device.

For example, the transmit end device and the receive end device may establish a direct connection through Wi-Fi Direct (Wi-FiDirect), which may specifically include establishing a transmission control protocol (transmission control protocol, TCP) connection and creating a port used for the real time streaming protocol (real time streaming protocol, RTSP) to manage and control the connection.

For example, the transmit end device and the receive end device may alternatively establish a connection by using an access point AP device. After the connection is established, data and instructions that need to be transmitted between the transmit end device and the receive end device are sent to the access point AP device, and are forwarded by the access point device to the other party.

Stage (4): Capability negotiation: Before streaming media content such as a screen image, a video, an audio, or a picture is formally transmitted, the transmit end device and the receive end device need to exchange some parameter information, for example, an audio/video format supported by both parties, and a subsequent process can be continued only after negotiation between the transmit end device and the receive end device succeeds.

Stage (5): Session establishment and streaming media transmission: After step (4) is completed, the transmit end device and the receive end device establish a session, and then the transmit end device may start to transmit the streaming media content. After encoding the streaming media content, the transmit end device sends the streaming media content to the receive end device. The receive end device decodes the received data and plays the received data.

Figure 4:
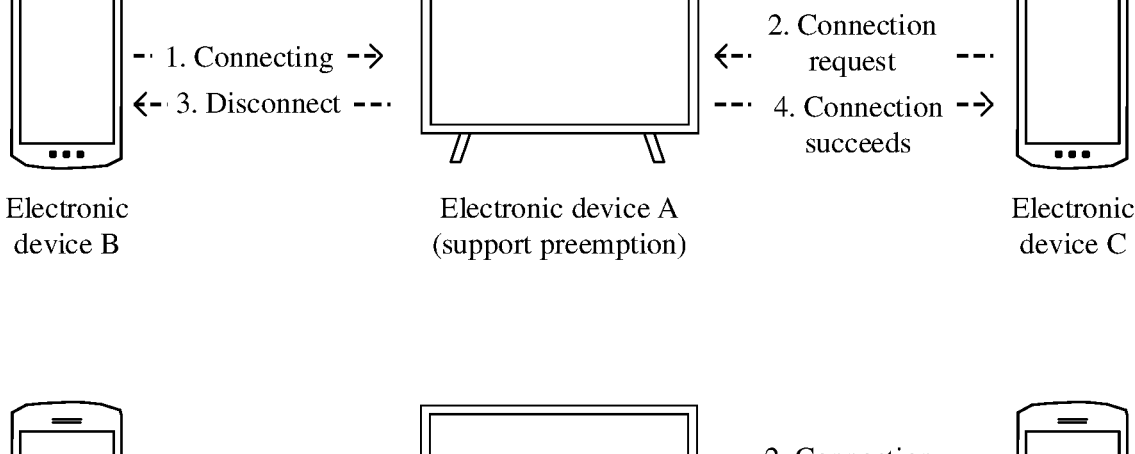
FIG. 4 is a schematic diagram of projection connection preemption.

Because "one receive end device can establish a projection connection to only one transmit end device at a same moment", as shown in FIG. 4, in an example of an electronic device A and an electronic device B, when the electronic device A and the electronic device B currently have established a projection connection, if an electronic device C wants to establish a projection connection to the electronic device A, projection connection preemption needs to be performed. Specifically, the electronic device C may initiate a connection request to the electronic device A. If the electronic device A supports projection connection preemption, the electronic device A releases the projection connection between the electronic device A and the electronic device B, and establishes a connection to the electronic device C. If the electronic device A does not support projection connection preemption, the electronic device A does not accept the connection request of the electronic device C, and the electronic device C fails in projection connection preemption.

A feature of the receive end device "supporting projection connection preemption" or "not supporting projection connection preemption" may be summarized as a preemption capability of the receive end device. Generally, the preemption capability of the receive end device may include the following cases:

(1) Support projection connection preemption.

(2) Do not support projection connection preemption, and when a projection connection is currently established between the receive end device and a transmit end device, the receive end device can be discovered by another transmit end device (briefly referred to as not supporting projection connection preemption and capable of being discovered).

(3) Do not support projection connection preemption, and when a projection connection is currently established between the receive end device and a transmit end device, the receive end device cannot be discovered by another transmit end device until the receive end device releases the projection connection (briefly referred to as not supporting projection connection preemption and not capable of being discovered).

Based on the foregoing three cases, Table 1 shows a correspondence between a preemption capability of the receive end device and a preemption result of the transmit end device.

TABLE 1

| Receive end device | Preemption capability | Preemption result |
|---|---|---|
| Electronic device B | Supporting projection connection preemption | Preemption succeeds, and a projection connection is established to the electronic device B |
| Electronic device C | Not supporting projection connection preemption and capable of being discovered | The electronic device C can be discovered, but preemption fails, and a projection connection cannot be established to the electronic device C |
| Electronic device D | Not supporting projection connection preemption and not capable of being discovered | The electronic device D cannot be discovered, and projection connection preemption cannot be initiated |

It can be learned from Table 1 that whether a transmit end device can succeed in preemption for a receive end device depends on a preemption capability of the receive end device and is not affected by the user or the transmit end device. Therefore, when using streaming media projection, the user encounters at least the following problems:

Problem (1): In a conference room, an exhibition hall, a store, or another occasion, the user can use the electronic device B to project documents, pictures or videos on the electronic device A to display content to the public. In this case, if the electronic device C initiates a connection request to the electronic device A, and the electronic device A supports projection connection preemption, the electronic device A is disconnected from the electronic device B, and plays content projected by the electronic device C, thereby causing interference to content displayed on the electronic device A.

Problem (2): In a home or office scenario, when a plurality of transmit end devices need to project streaming media content on the electronic device A in turn, if the electronic device A does not support projection connection preemption, the electronic device A needs to release an existing projection connection to accept a new connection request, which affects user experience.

Problem (3): When the user hopes to establish a projection connection to the electronic device A by using the electronic device B, if the electronic device A has established a projection connection to another transmit end device, and the electronic device "does not support projection connection preemption and cannot be discovered", the electronic device B cannot discover the electronic device A in the "device discovery" step of establishing a projection connection, consequently the electronic device B cannot establish a projection connection to the electronic device A, and the user does not know what causes the electronic device A to be unable to be discovered and connected, thereby affecting user experience.

It can be learned that design of the preemption logic is not perfect in the current streaming media projection solution, and affects user experience.

An embodiment of this application provides a projection connection control method, which may be applied to any electronic device that can be used as a transmit end device or a receive end device in a streaming media projection scenario. This method can optimize a preemption logic of streaming media projection based on a requirement of a user, thereby improving user experience.

For example, the electronic device in the embodiments of this application may be a mobile phone, a tablet computer, a large-screen display device (for example, a smart TV, a smart screen, a laser TV, or a projection device), a notebook computer, a personal computer (PC), a smart speaker, an intelligent alarm clock, an augmented reality (augmented reality, AR) device, a virtual reality (virtual reality, VR) device, or the like. A specific form of the electronic device in the embodiments of this application is not specifically limited.

The following describes implementations of the embodiments of this application in detail with reference to the accompanying drawings.

Figure 5:
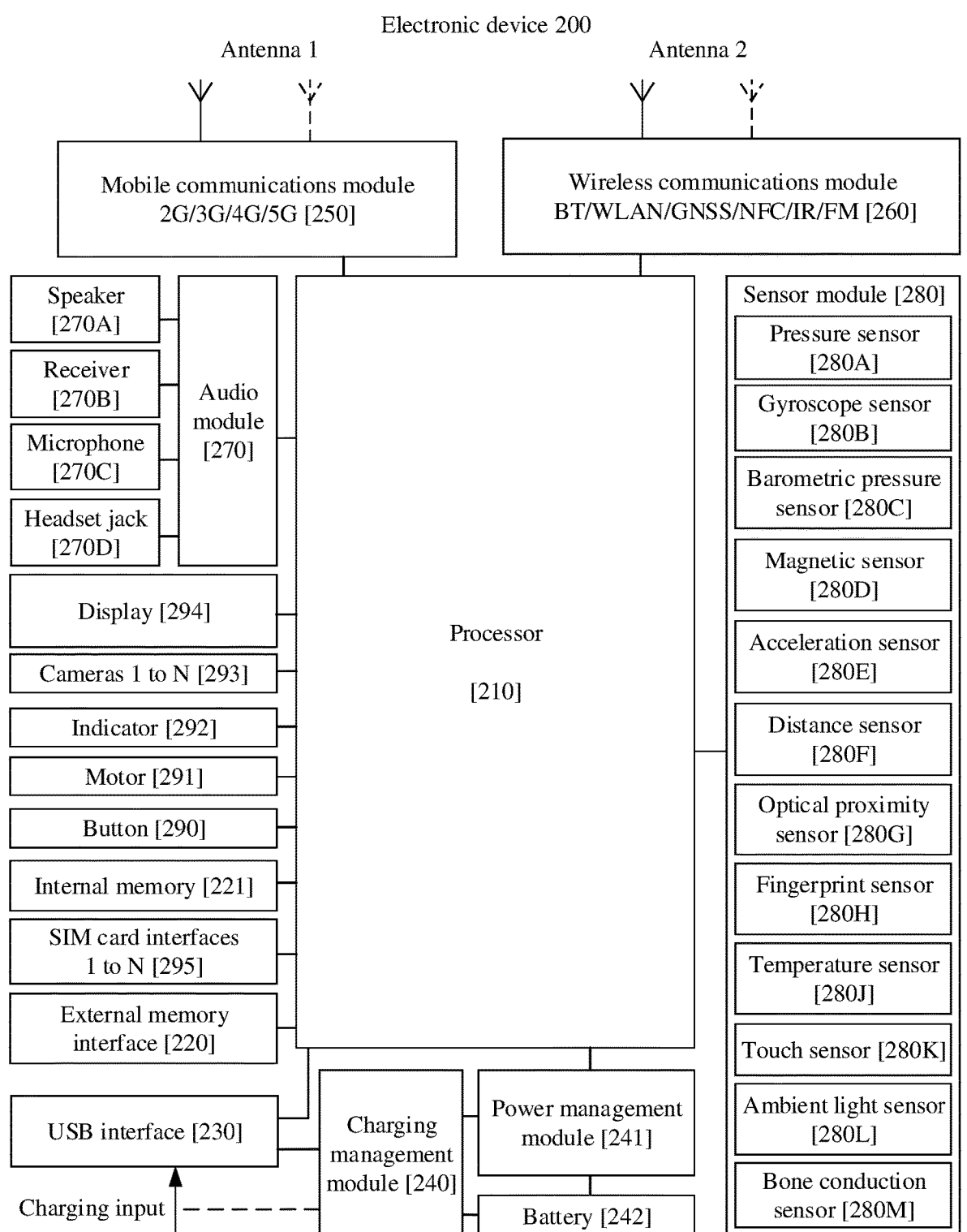
FIG. 5 is a schematic diagram of a structure of an electronic device according to an embodiment of this application.

FIG. 5 is a schematic diagram of a structure of an electronic device 200 according to an embodiment of this application. As shown in FIG. 5, the electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, and a subscriber identification module (subscriber identification module, SIM) card interface 295.

The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280-1, a temperature sensor 280J, a touch sensor 280K, an ambient light sensor 280L, and a bone conduction sensor 280M.

It may be understood that the structure shown in this embodiment does not constitute a specific limitation on the electronic device 200. In other embodiments, the electronic device 200 may include more or fewer components than those shown in the figure, or some components may be combined, or some components may be split, or components are arranged in different manners. The illustrated components may be implemented by hardware, software, or a combination of software and hardware.

The processor 210 may include one or more processing units. For example, the processor 210 may include an application processor (application processor, AP), a modem processor, a GPU, an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a neural center and a command center of the electronic device 200. The controller may generate an operation control signal based on an instruction operation code and a time sequence signal, to control instruction reading and instruction execution.

A memory may be disposed in the processor 210, and is configured to store an instruction and data. In some embodiments, the memory in the processor 210 is a cache memory. The memory may store an instruction or data that has just been used or is cyclically used by the processor 210. If the processor 210 needs to use the instruction or data again, the instruction or data may be directly invoked from the memory. Therefore, repeated access is avoided, a waiting time of the processor 210 is reduced, and system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment of the present invention is merely an example for description, and does not constitute a limitation on the structure of the electronic device 200. In some other embodiments, the electronic device 200 may alternatively use an interface connection manner different from that in the foregoing embodiment, or use a combination of a plurality of interface connection manners.

The charging management module 240 is configured to receive a charging input from a charger. While charging the battery 242, the charging management module 240 may further supply power to the electronic device by using the power management module 241.

The power management module 241 is configured to connect the battery 242, the charging management module 240, and the processor 210. The power management module 241 receives input of the battery 242 and/or the charging management module 240, and supplies power to the processor 210, the internal memory 221, the external memory, the display 294, the camera 293, the wireless communications module 260, and the like. In some other embodiments, the power management module 241 may alternatively be disposed in the processor 210. In some other embodiments, the power management module 241 and the charging management module 240 may alternatively be disposed in a same component.

A wireless communication function of the electronic device 200 may be implemented through the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the electronic device 200 may be configured to cover a single or a plurality of communication frequency bands. Different antennas may be multiplexed to improve antenna utilization. For example, the antenna 1 may be multiplexed into a diversity antenna of a wireless local area network.

The mobile communications module 250 may provide a wireless communication solution, including 2G/3G/4G/5G or the like, that is applied to the electronic device 200. The mobile communications module 250 may include at least one filter, a switch, a power amplifier, a low noise amplifier (low noise amplifier, LNA), and the like. The mobile communications module 250 may receive an electromagnetic wave through the antenna 1, perform processing such as filtering and amplification on the received electromagnetic wave, and transmit a processed electromagnetic wave to the modem processor for demodulation. The mobile communications module 250 may further amplify a signal obtained after modulation by the modem processor, and convert the signal into an electromagnetic wave through the antenna 1 for radiation.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 270A, the receiver 270B, or the like), or displays an image or a video on the display 294.

The wireless communications module 260 may provide a solution to wireless communication applied to the electronic device 200, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 260 may be one or more components that integrate at least one communication processing module. The wireless communications module 260 receives an electromagnetic wave over the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation over the antenna 2.

In some embodiments, the antenna 1 of the electronic device 200 is coupled to the mobile communications module 250, and the antenna 2 is coupled to the wireless communications module 260, so that the electronic device 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 200 implements a display function by using the GPU, the display 294, the application processor, and the like. The GPU is a microprocessor for image processing, and is connected to the display 294 and the application processor. The GPU is configured to perform mathematical and geometrical calculation, and is configured to perform graphics rendering. The processor 210 may include one or more GPUs that execute program instructions to generate or change display information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a sub-millimeter light emitting diode (Mini LED), a micro light emitting diode (Micro LED), a micro organic light-emitting diode (Micro OLED), a quantum dot light emitting diode LED (quantum dot light emitting diodes, QLED), or the like.

The display 294 in this embodiment of this application may be a touchscreen. That is, the touch sensor 280K is integrated into the display 294. The touch sensor 280K may also be referred to as a "touch panel". That is, the display 294 may include a display panel and a touch panel, and the touch sensor 280K and the display 294 form a touchscreen, which is also referred to as a "touch screen". The touch sensor 280K is configured to detect a touch operation performed on or near the touch sensor 280K. The touch sensor 280K may transfer the detected touch operation to an upper layer through a drive of a kernel layer, to determine a touch event type. A visual output related to a touch operation may be provided by using the display 294. In some other embodiments, the touch sensor 280K may alternatively be disposed on a surface of the electronic device 200 at a position different from a position of the display 294.

The electronic device 200 may implement a photographing function by using the ISP, the camera 293, the video codec, the GPU, the display 294, the application processor, and the like. The ISP is configured to process data fed back by the camera 293. The camera 293 is configured to capture a still image or a video. The digital signal processor is configured to process a digital signal, and in addition to a digital image signal, may further process another digital signal. The video codec is configured to compress or decompress a digital video. The electronic device 200 may support one or more video codecs. In this way, the electronic device 200 may play or record videos in a plurality of coding formats, for example, moving picture experts group (moving picture experts group, MPEG) 1, MPEG 2, MPEG 3, and MPEG 4.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 200, for example, image recognition, facial recognition, voice recognition, and text understanding.

The external memory interface 220 may be configured to connect to an external memory card, for example, a micro SD card, to extend a storage capability of the electronic device 200. The external storage card communicates with the processor 210 through the external memory interface 220, to implement a data storage function. For example, files such as music and a video are stored in the external memory card. The internal memory 221 may be configured to store computer-executable program code, where the computer-executable program code includes instructions. The processor 210 executes various functional applications of the electronic device 200 and data processing by running instructions stored in the internal memory 221. For example, in this embodiment of this application, the processor 210 may execute an instruction stored in the internal memory 221. The internal memory 221 may include a program storage area and a data storage area. The program storage area may store an operating system, an application program (for example, a sound playback function or an image playback function) required by at least one function, and the like. The data storage area may store data (for example, audio data and an address book) and the like created when the electronic device 200 is used. In addition, the internal memory 221 may include a high-speed random access memory, or may include a non-volatile memory such as at least one magnetic disk memory, a flash memory, or a universal flash storage (universal flash storage, UFS).

The electronic device 200 may implement audio functions by using the audio module 270, the speaker 270A, the receiver 270B, the microphone 270C, the headset jack 270D, the application processor, and the like. The audio functions are, for example, music playback and recording.

The audio module 270 is configured to convert digital audio information into an analog audio signal for output, and is also configured to convert an analog audio input into a digital audio signal. The audio module 270 may be further configured to encode and decode an audio signal. The speaker 270A, also referred to as a "loudspeaker", is configured to convert an audio electrical signal into a sound signal. The receiver 270B, also referred to as an "earpiece", is configured to convert an audio electrical signal into a sound signal. The microphone 270C, also referred to as a "mike" or a "mic", is configured to convert a sound signal into an electrical signal. The headset jack 270D is configured to connect to a wired headset.

The pressure sensor 280A is configured to sense a pressure signal, and may convert the pressure signal into an electrical signal. In some embodiments, the pressure sensor 280A may be disposed on the display 294. There are many types of pressure sensors 280A, such as a resistive pressure sensor, an inductive pressure sensor, and a capacitive pressure sensor. The capacitive pressure sensor may include at least two parallel plates made of conductive materials. When force is exerted on the pressure sensor 280A, capacitance between electrodes changes. The electronic device 200 determines strength of the pressure based on the change of the capacitance. When a touch operation is performed on the display 294, the electronic device 200 detects strength of the touch operation by using the pressure sensor 280A. The electronic device 200 may calculate a touch position based on a detected signal of the pressure sensor 280A. In some embodiments, touch operations that are performed at a same touch location but have different touch operation strength may correspond to different operation instructions. In this embodiment of this application, the electronic device 200 may obtain a pressing force of the touch operation of the user by using the pressure sensor 280A.

The button 290 includes a power-on button, a volume button, and the like. The button 290 may be a mechanical button, or may be a touch-sensitive button. The electronic device 200 may receive a button input, and generate a button signal input related to user setting and function control of the electronic device 200. The motor 291 may generate a vibration prompt. The motor 291 may be used for an incoming call vibration prompt, or may be used for touch vibration feedback. The indicator 292 may be an indicator light, and may be used to indicate a charging status or a power change, or may be used to indicate a message, a missed call, a notification, or the like. The SIM card interface 295 is configured to connect to a SIM card. The SIM card may be inserted into the SIM card interface 295 or pulled out of the SIM card interface 295, so that the SIM card is in contact with or separated from the electronic device 200. The electronic device 200 may support one or N SIM card interfaces, where N is a positive integer greater than 1. The SIM card interface 295 may support a nano-SIM card, a micro-SIM card, a SIM card, and the like.

The method in the following embodiment may be implemented by two or more electronic devices 200 having the foregoing hardware structure. Based on a projection direction of streaming media content, some electronic devices may be used as transmit end devices, and some electronic devices may be used as receive end devices. According to the display 294 of the electronic device 200, when a user performs specific touch, tap, or slide operation on the display 294, it may be understood that the user sends a user instruction to the electronic device, so that the electronic device performs a specific step in the embodiment of this application in response to the specific user instruction.

Embodiment (1)

Figure 6:
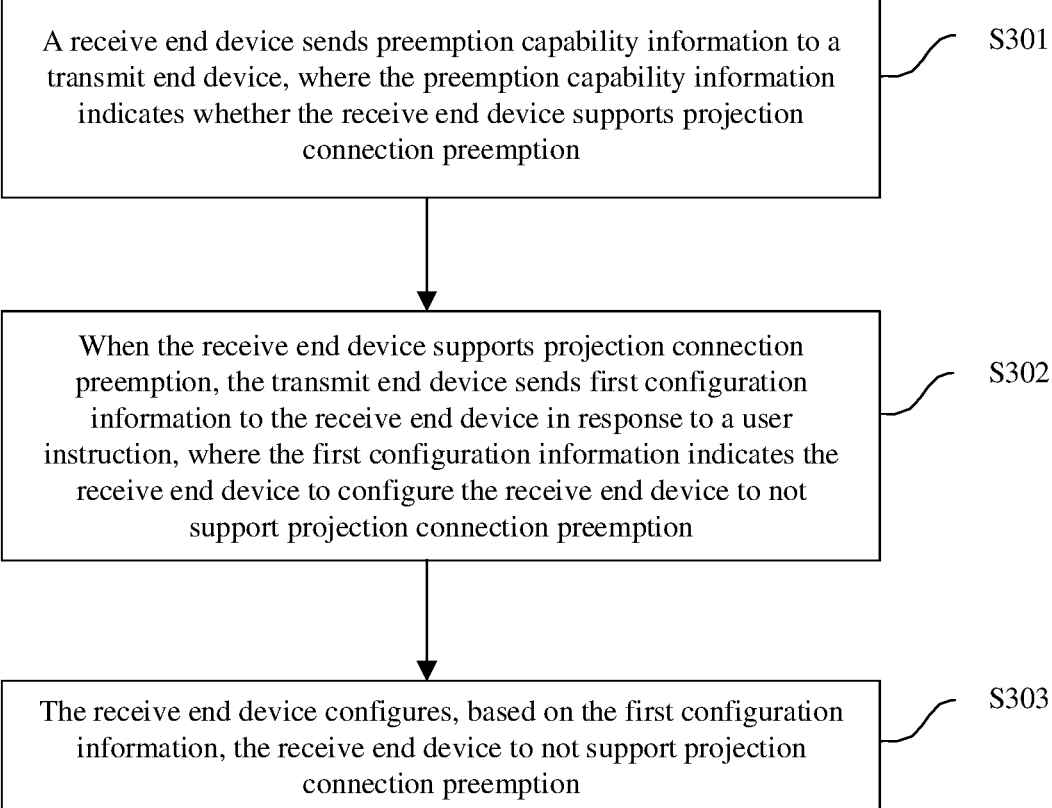
FIG. 6 is a flowchart of a projection connection control method according to an embodiment of this application.

Embodiment (1) of this application provides a projection connection control method. As shown in FIG. 6, the method may include step S301 to step S303.

Step S301: A receive end device sends preemption capability information to a transmit end device, where the preemption capability information indicates whether the receive end device supports projection connection preemption.

The receive end device may send the preemption capability information to the transmit end device in the "device discovery" stage in FIG. 2.

Figure 7:
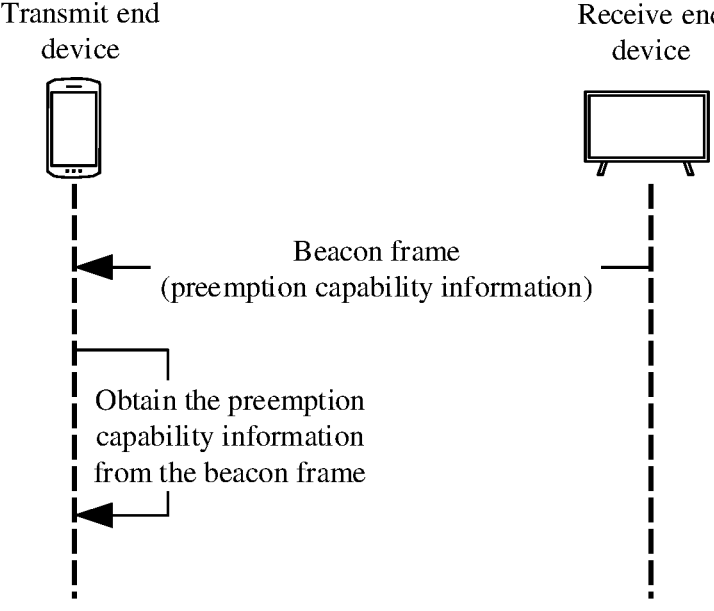
FIG. 7 is a schematic diagram in which a receive end device sends preemption capability information to a transmit end device.

In an implementation, as shown in FIG. 7, when the transmit end device discovers the receive end device in a passive scanning manner, the receive end device may periodically broadcast a beacon frame (Beacon Frame) in a network, and add the preemption capability information to the beacon frame, so as to notify that the receive end device exists. The transmit end device discovers the receive end device by detecting the beacon frame, and obtains the preemption capability information of the receive end device from the detected beacon frame (Beacon Frame).

Figure 8:
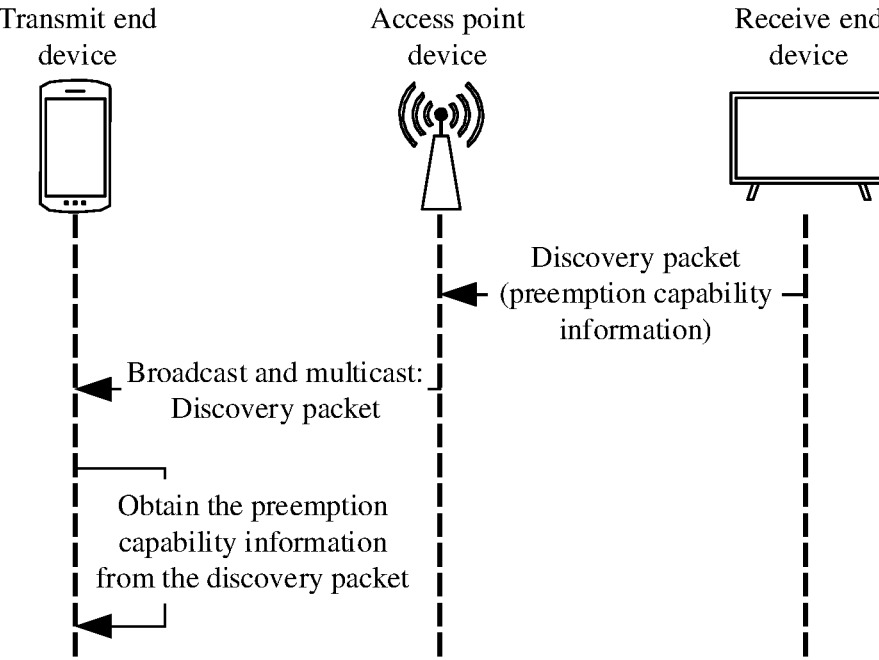
FIG. 8 is a schematic diagram in which a receive end device sends preemption capability information to a transmit end device.

In an implementation, as shown in FIG. 8, when the transmit end device discovers the receive end device in a passive scanning manner, the second device may send a discovery packet to an access point AP device connected to the second device, and add the preemption capability information to the discovery packet. After receiving the discovery packet, the access point AP device broadcasts or multicasts the discovery packet in a subnet of the AP device based on an IP packet protocol type of the discovery packet. The transmit end device receives the discovery packet broadcast or multicast by the access point AP device, and obtains the preemption capability information of the receive end device from the discovery packet.

Figure 9:
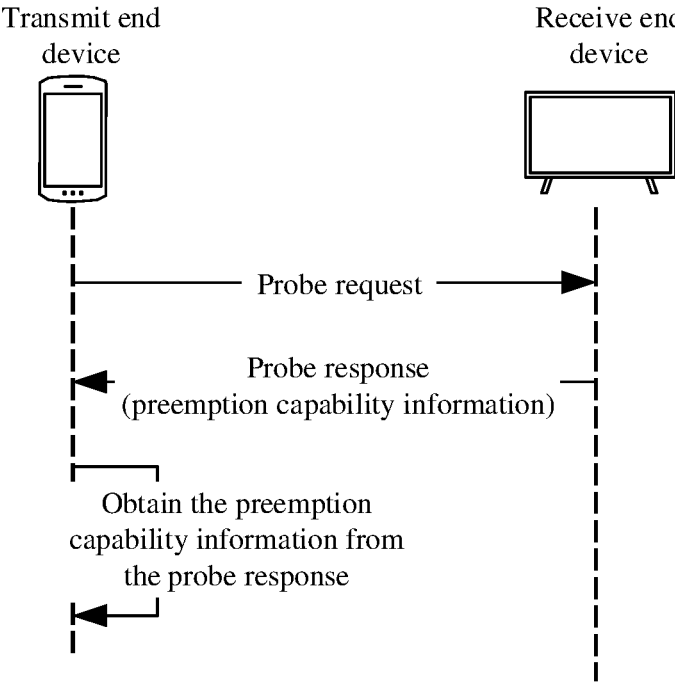
FIG. 9 is a schematic diagram in which a receive end device sends preemption capability information to a transmit end device.

In an implementation, as shown in FIG. 9, when the transmit end device discovers the receive end device in an active scanning manner, the transmit end device sends a probe request (Probe Request) on a radio channel, so as to detect a receive end device that exists nearby. After receiving the probe request of the transmit end device, the receive end device sends a probe response (Probe Response) to the transmit end device, and adds the preemption capability information to the probe response, so as to notify the receive end device of the existence of the receive end device. The transmit end device obtains the probe response of the receive end device, and obtains the preemption capability information from the probe response.

Table 2 shows an implementable field format of the preemption capability information.

TABLE 2

| Attribute (attribute) | OUI (organizationally unique identifier) | Feature Id (feature ID) | Preemption Information (preemption capability information) |
|---|---|---|---|
| Value (value) | 0x00E0FC | 0x1 | 0: Preemptable<br>1: Unpreemptable |

An organizationally unique identifier (organizationally unique identifier, OUI) may be a part of a MAC address of the receive end device, and is used to identify a manufacturer of the receive end device. Different values of the feature ID may be corresponding to different information elements. The transmit end device may determine, based on a value of the feature ID, a meaning expressed by the corresponding information element. For example, in Table 1, the information element corresponding to the feature ID "0x1" is the preemption capability information. The preemption capability information may be indicated by using a character with a length of one bit. For example, in Table 2, a value of the preemption capability information may be 0 or 1. The value of the preemption capability information being 0 indicates that the receive end device supports projection connection preemption. The value of the preemption capability information being 1 indicates that the receive end device does not support projection connection preemption.

Further, in the "device discovery" stage in FIG. 2, the receive end device may further send connection status information of the receive end device to the transmit end device. The connection status information indicates whether the receive end device currently establishes a projection connection to another transmit end device. The connection status information may be sent together with the preemption capability information, or may be sent in sequence.

Figure 10:
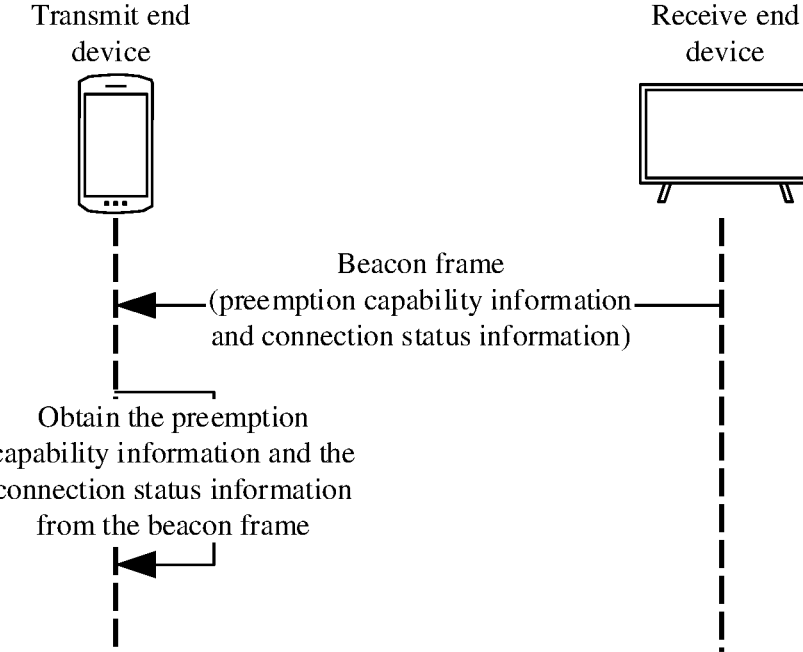
FIG. 10 is a schematic diagram in which a receive end device sends connection status information to a transmit end device.

In an implementation, as shown in FIG. 10, when the transmit end device discovers the receive end device in a passive scanning manner, the receive end device may periodically broadcast a beacon frame (Beacon Frame) in a network, and add the preemption capability information and the connection status information to the beacon frame, so as to notify that the receive end device exists. The transmit end device discovers the receive end device by detecting the beacon frame, and obtains the preemption capability information and the connection status information of the receive end device from the detected beacon frame (Beacon Frame).

Figure 11:
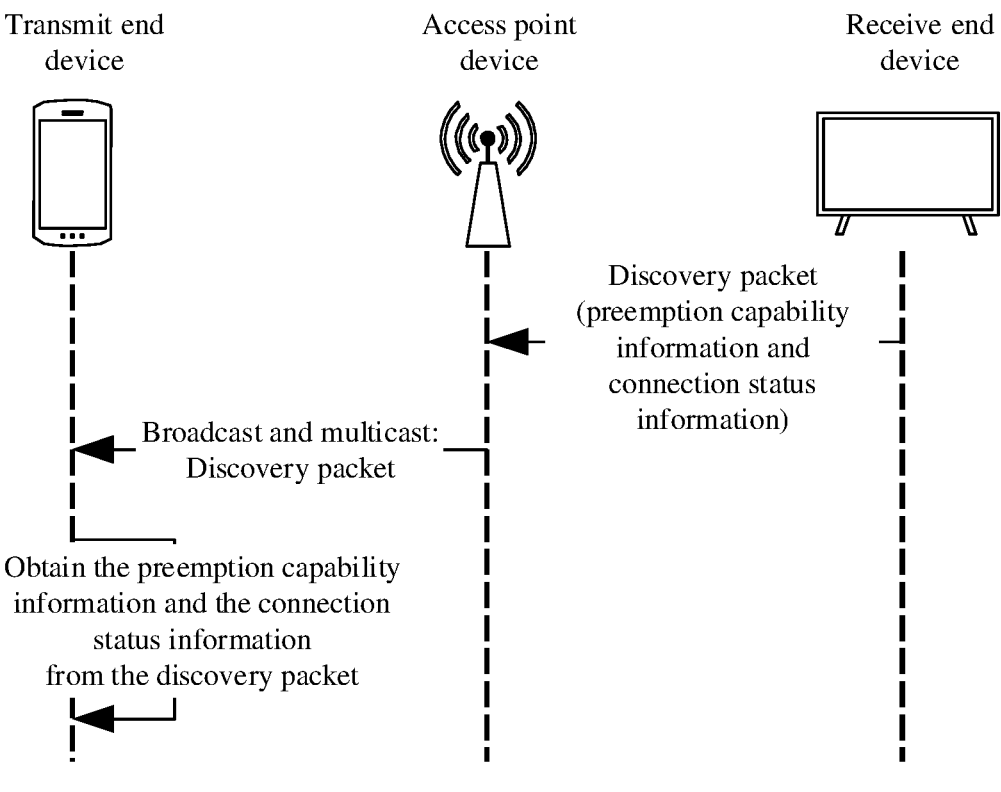
FIG. 11 is a schematic diagram in which a receive end device sends connection status information to a transmit end device.

In an implementation, as shown in FIG. 11, when the transmit end device discovers the receive end device in a passive scanning manner, the second device may send a discovery packet to an access point AP device connected to the second device, and add the preemption capability information and the connection status information to the discovery packet. After receiving the discovery packet, the access point AP device broadcasts or multicasts the discovery packet in a subnet of the AP device based on an IP packet protocol type of the discovery packet. The transmit end device receives the discovery packet broadcast or multicast by the access point AP device, and obtains the preemption capability information and the connection status information of the receive end device from the discovery packet.

Figure 12:
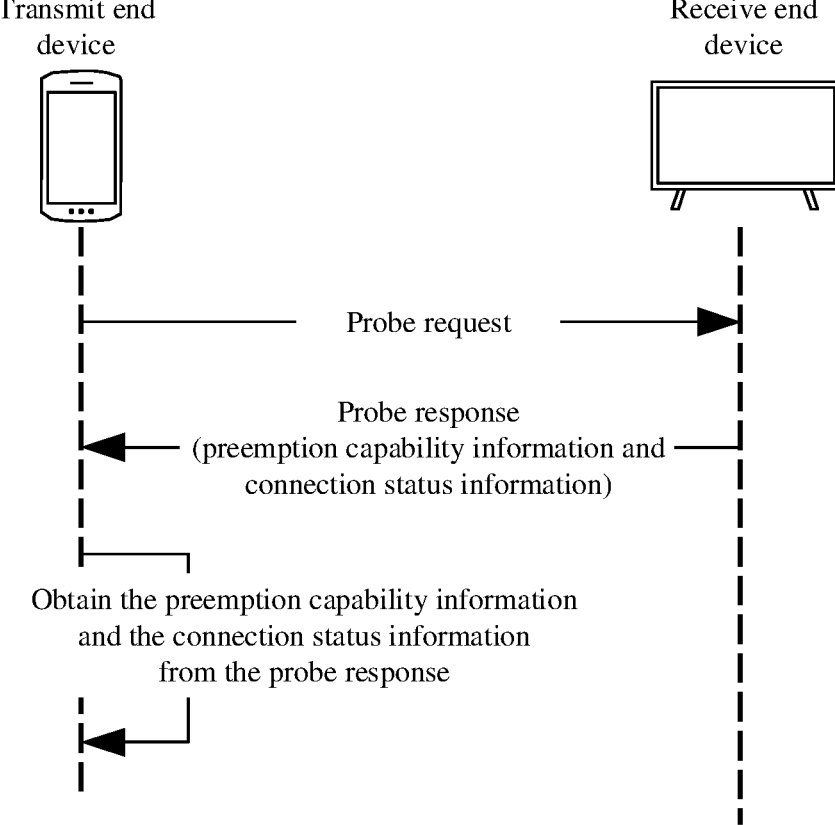
FIG. 12 is a schematic diagram in which a receive end device sends connection status information to a transmit end device.

In an implementation, as shown in FIG. 12, when the transmit end device discovers the receive end device in an active scanning manner, the transmit end device sends a probe request (Probe Request) on a radio channel, so as to detect a receive end device that exists nearby. After receiving the probe request of the transmit end device, the receive end device sends a probe response (Probe Response) to the transmit end device, and adds the preemption capability information and the connection status information to the probe response, so as to notify the receive end device of the existence of the receive end device. The transmit end device obtains the probe response of the receive end device, and obtains the preemption capability information and the connection status information from the probe response.

Figure 13:
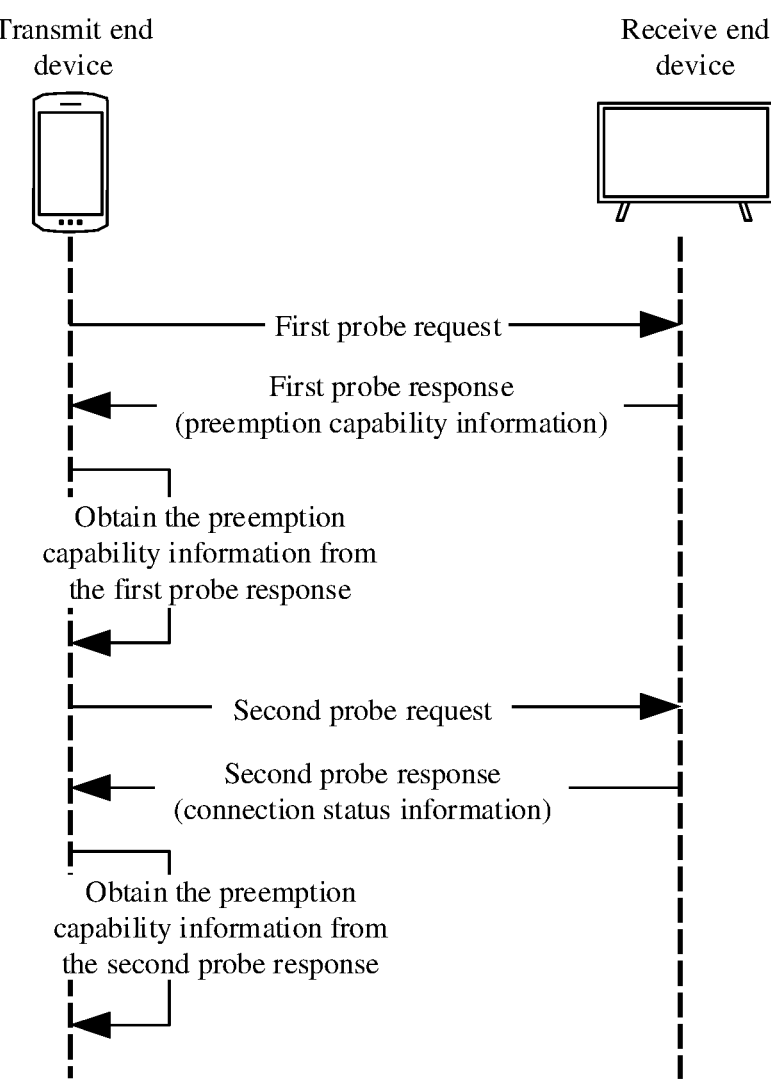
FIG. 13 is a schematic diagram in which a receive end device sends connection status information to a transmit end device.

In an implementation, the transmit end device may send a probe request (Probe Request) to the receive end device for a plurality of times, and the receive end device uses a plurality of probe responses (Probe Response) to carry the preemption capability information and the connection status information respectively. As shown in FIG. 13, the transmit end device first sends a first probe request to the receive end device. The receive end device sends a first probe response that carries the preemption capability information to the transmit end device in response to the first probe request. Then, the transmit end device sends a second probe request to the receive end device. The receive end device sends a second probe response that carries the connection status information to the transmit end device in response to the second probe request.

It may be understood that, in the implementation shown in FIG. 13, the receive end device may alternatively add the connection status information to the first probe response, and add the preemption capability information to the second probe response. Details are not described herein again.

Table 3 shows an implementable field format of the preemption capability information and the connection status information.

Further, in the "device discovery" stage, the transmit end device may further obtain a projection mode supported by the receive end device. For example, when the transmit end device is a mobile phone (or a tablet computer), and the receive end device is a large-screen display device (such as a smart screen or a smart TV), the projection mode may include a computer mode and a mobile phone mode. In the computer mode, the mobile phone may display different content from the large-screen display device, for example, the large-screen display device displays a video delivered by the mobile phone, and the mobile phone displays a chat software used by the user. In addition, in the computer mode, the large-screen display device may display a user operation interface of a computer system. The mobile phone may enter a touchpad mode, and a touchpad area is simulated on the display. When the user taps or slides in the touchpad area, a function same as that of a physical touchpad of the computer can be implemented. In addition, when the user performs a specified operation in the touchpad area, the mobile phone may display a soft keyboard on the display. When the user performs a tap operation on the soft keyboard, a same function as that of the physical keyboard of the computer can be implemented.

In specific implementation, when the transmit end device discovers the receive end device in a passive scanning manner, the receive end device may configure projection mode information in the beacon frame or discovery packet broadcast by the receive end device, where the projection mode information is used to indicate, to the transmit end device, the projection mode supported by the receive end device. When the transmit end device discovers the receive end device in an active scanning manner, the receive end device may configure projection mode information in the probe response sent to the transmit end device. In addition, if the receive end device does not send the projection mode information to the transmit end device, the transmit end device may further determine, based on information such as a manufacturer (which may be determined based on an organizationally unique identifier OUI) or a device model of the receive end device, whether the receive end device

TABLE 3

| Attribute (attribute) | OUI (organizationally unique identifier) | Feature Id (feature ID) | Preemption Information (preemption capability information) | Connection Status (connection status information) |
|---|---|---|---|---|
| Value (value) | 0x00E0FC | 0x1 | 0: Preemptable 1: Unpreemptable | 0: Not connected 1: Connecting 2: Connected |

The connection status information may be represented by using a character with a length of one bit. For example, in Table 2, a value of the connection status information may be 0, 1, or 2. When the preemption capability information is 0, it indicates that the receive end device currently has not established a projection connection to a transmit end device. When the preemption capability information is 1, it indicates that the receive end device is currently establishing a projection connection to a transmit end device, for example, the "connection establishment" stage in FIG. 2. When the preemption capability information is 2, it indicates that the receive end device currently has established a projection connection to a transmit end device, for example, the "capability negotiation" stage in FIG. 2 or the "session establishment and streaming media transmission" stage.

supports the computer mode and/or the mobile phone mode. To implement this determining capability, the transmit end device may maintain a list, where the list may include a correspondence between a manufacturer and a projection mode, or a correspondence between a device model and a projection mode, so that the transmit end device can determine, in a manner of searching the table, the projection mode supported by the receive end device.

In an example, the projection mode information may be represented by using a character with a length of one bit. For example, a value of the projection mode information may be 0, 1, or 2. When the value of the projection mode information is 0, it indicates that the receive end device supports projection only in the mobile phone mode; when the value of the projection mode information is 1, it indicates that the receive end device supports projection only in the computer mode; or when the value of the projection mode information is 2, it indicates that the receive end device supports projection both in the mobile phone mode and the computer mode.

Figure 14:
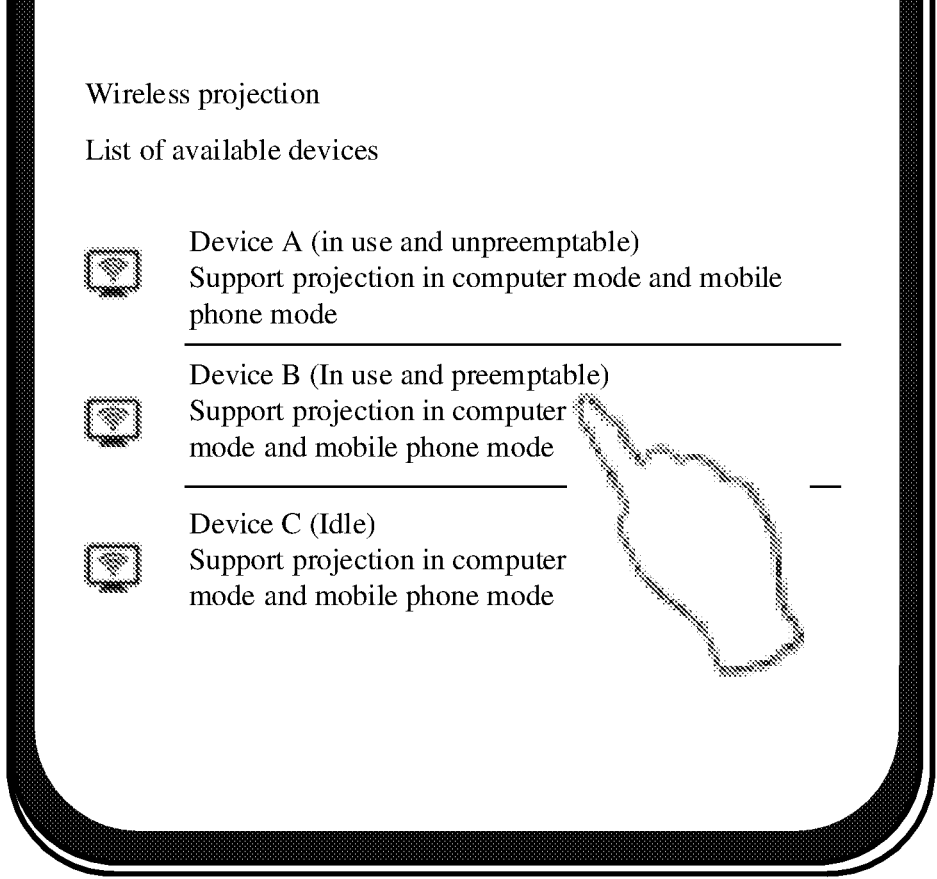
FIG. 14 is a schematic diagram in which a transmit end device displays a list of available devices to a user.

FIG. 14 is a schematic diagram in which a transmit end device displays a list of available devices to a user. As shown in FIG. 14, after completing all procedures in the "device discovery" stage, the transmit end device may generate a list of available devices, and display the list of available devices on the display. The list of available devices includes information such as device identifiers of all receive end devices discovered by the transmit end device, and a connection status, a preemption capability, and a supported projection mode of each receive end device. For example, the list of available devices in FIG. 14 includes three transmit end devices, and the device identifiers are respectively device A, device B, and device C. "In use and unpreemptable" generalizes a connection status and a preemption capability of the device A, indicating that the device A has currently established a projection connection to another transmit end device, and the device A does not support projection connection preemption. "In use and preemptable" generalizes a connection status and a preemption capability of the device B, indicating that the device B has currently established a projection connection with another transmit end device, and the receive end device does not support the projection connection. "Idle" generalizes a connection status of the device C, and indicates that the device C currently does not establish a projection connection to any transmit end device. When the device C is in an "idle" state, projection connection preemption is not involved. Therefore, the available device list does not display a preemption capability of the device C.

Based on the list of available devices shown in FIG. 14, the user may select, in a manner of tapping a device identifier or operating a button on the display, a receive end device that the user wants to connect, so that the transmit end device sends a projection connection request to the receive end device that the user wants to connect. The device A is configured as unselectable by the transmit end device because the device A is "in use and unpreemptable". Based on different connection statuses and preemption capabilities of receive end devices, different responses are obtained for connection requests of the transmit end device.

Specifically, when the user selects the device B, the transmit end device sends a connection request to the device B. Because the device B supports projection connection preemption, the device B releases the projection connection established with the another device, and establishes a connection to the transmit end device. When the user selects the device C, the transmit end device sends a connection request to the device C. Because the device C is in an idle state, the device C accepts the connection request of the transmit end device, and establishes a projection connection to the transmit end device. The foregoing connection request may be, for example, a request used by the transmit end device to establish a Wi-Fi direct connection to the receive end device, and may include, for example, a TCP packet used to request to establish a TCP connection and an RTSP packet used to request to establish an RTSP connection.

After the user selects the receive end device, the transmit end device and the receive end device may further perform steps S302 and S303.

Step S302: When the receive end device supports projection connection preemption, the transmit end device sends first configuration information to the receive end device in response to a user instruction, where the first configuration information indicates the receive end device to configure the receive end device to not support projection connection preemption.

Step S303: The receive end device configures, based on the first configuration information, the receive end device to not support projection connection preemption.

In an implementation, the transmit end device may configure the first configuration information in the connection request, and send the first configuration information to the receive end device together with the connection request.

Figures 15A, 15B:
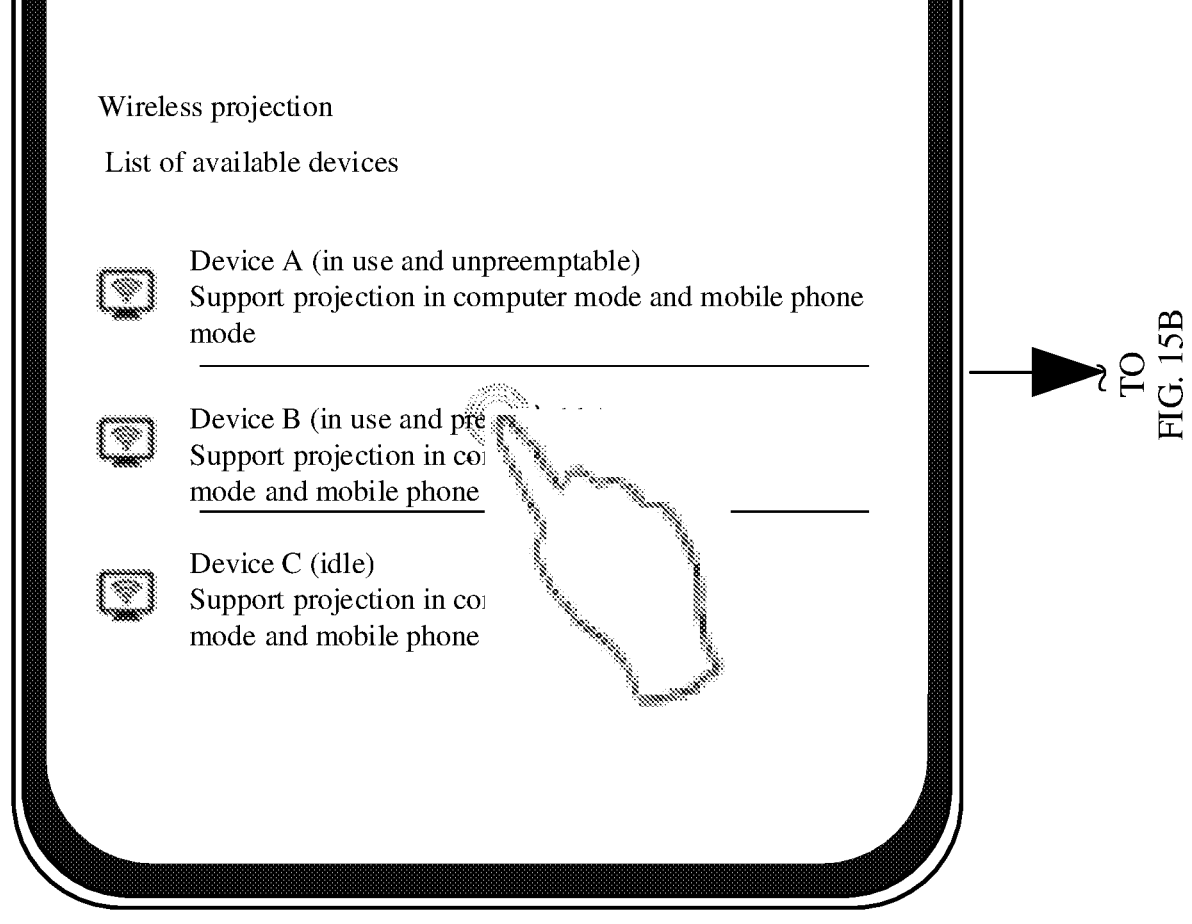
FIG. 15A and FIG. 15B are a schematic diagram in which a transmit end device obtains a user instruction.
Figures 15A, 15B:
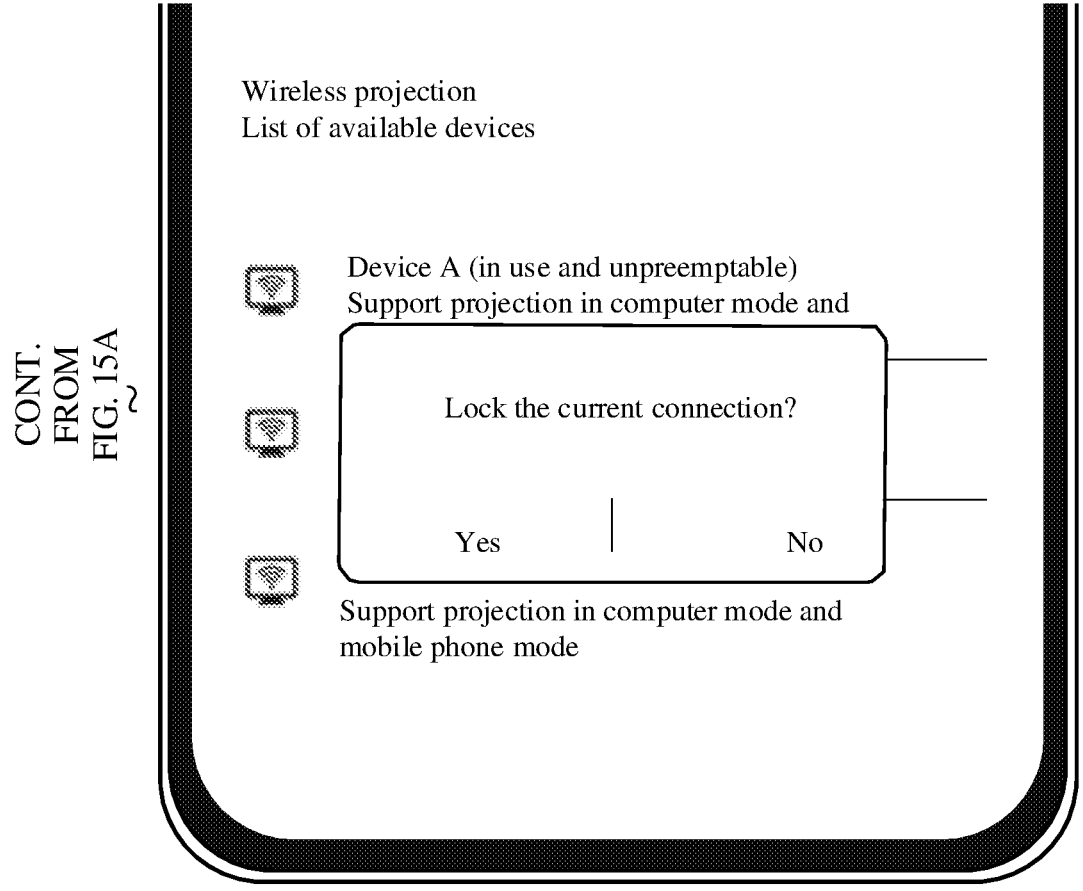

As shown in FIG. 15A and FIG. 15B, in specific implementation, when the user selects the receive end device in the list of available devices, the transmit end device generates, on the display, a dialog box used to query the user whether to lock the current connection. The user may select Yes (to lock) or No (not to lock) in the dialog box. If the user selects "Yes", the transmit end device sends the first configuration information to the receive end device. If the user selects "No", the user does not send the first configuration information.

For example, the transmit end device may configure the first configuration information in the TCP packet that is to be sent to the receive end device and that is used to request to establish a TCP connection. The receive end device obtains the first configuration information after receiving the TCP packet.

For example, the transmit end device may configure the first configuration information in the RTSP packet that is to be sent to the receive end device and that is used to request to establish an RTSP connection. The receive end device obtains the first configuration information after receiving the RTSP packet.

In an implementation, after the transmit end device establishes the projection connection to the receive end device, the transmit end device may separately send the first configuration information to the receive end device.

Figure 16:
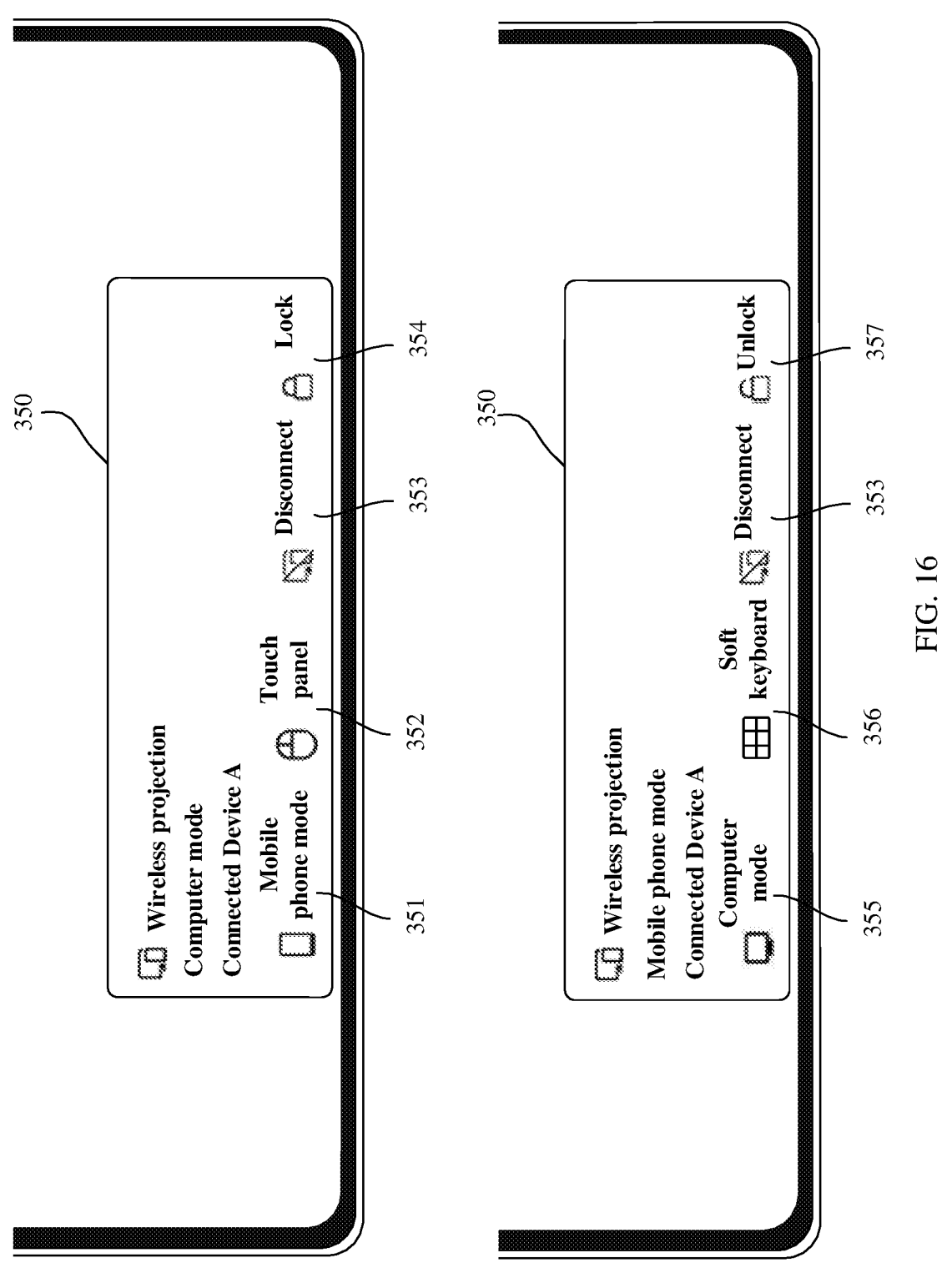
FIG. 16 is a schematic diagram of an instruction window displayed on a transmit end device.

In specific implementation, after the transmit end device establishes the projection connection to the receive end device, the transmit end device may generate an instruction window 350 shown in FIG. 16 on the display. The instruction window 350 may include one or more instruction buttons, including but not limited to: a projection mode button (for example, a computer mode button 355 and a mobile phone mode button 351), an input mode button (for example, a touchpad 352 and a soft keyboard 356), a disconnect button 353, an unlock button 357, and a lock button 354. When the receive end device supports projection connection preemption, the instruction window includes the lock button 354 shown in FIG. 16. When the receive end device does not support projection connection preemption, the instruction window includes the unlock button 357 shown in FIG. 16.

Figure 17:
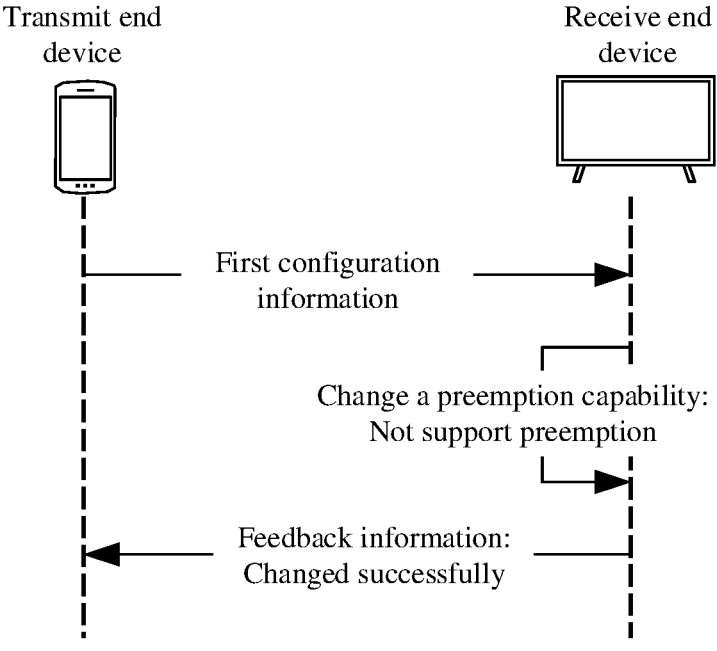
FIG. 17 is a schematic diagram in which a transmit end device sends first configuration information to a receive end device.

FIG. 17 is a schematic diagram in which a transmit end device sends first configuration information to a receive end device.

As shown in FIG. 17, when the receive end device supports projection connection preemption, if the user taps the lock button 354 on the display shown in FIG. 16, the transmit end device sends the first configuration information to the receive end device through a connection such as a TCP connection or an RTSP connection that is currently established with the receive end device. The receive end device changes the preemption capability of the receive end device to "not support projection connection preemption" in response to the first configuration information. After successfully changing the preemption capability, the receive end device may send feedback information to the transmit end device, so as to notify the receive end device of a change result of the preemption capability. In addition, after successfully changing the preemption capability, the receive end device updates preemption capability information configured in the beacon frame or discovery packet, for example, updates the preemption capability information from "0" to "1", so that the transmit end device can also obtain, by using the beacon frame or discovery packet of the receive end device, the preemption capability changed by the receive end device. After determining that the preemption capability of the receive end device is successfully changed to "not support projection connection preemption", the transmit end device refreshes the lock button 354 on the display to the unlock button 357.

Figure 18:
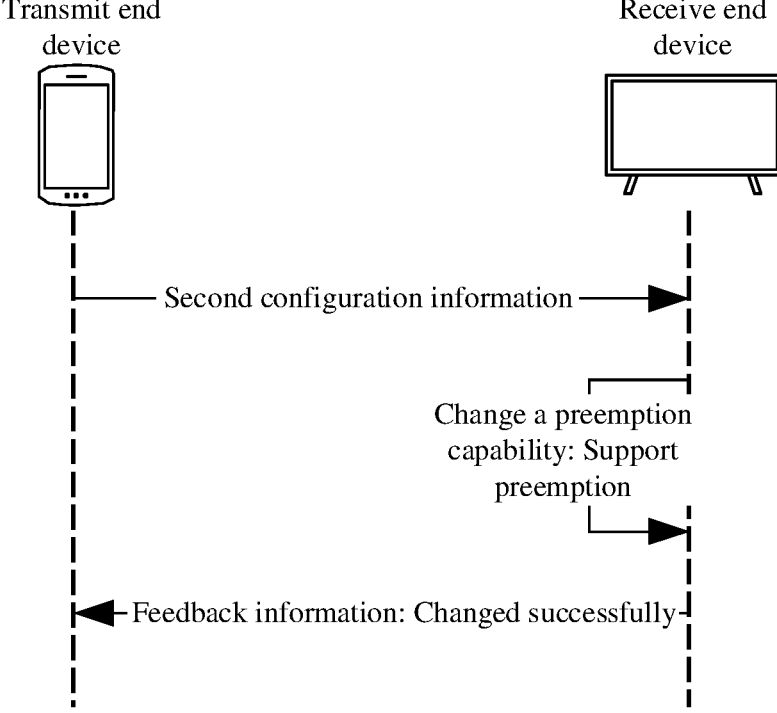
FIG. 18 is a schematic diagram in which a transmit end device sends second configuration information to a receive end device.

FIG. 18 is a schematic diagram in which a transmit end device sends second configuration information to a receive end device.

As shown in FIG. 18, when the receive end device does not support projection connection preemption, if the user taps the unlock button 357 on the display, the transmit end device sends the second configuration information to the receive end device through a connection such as a TCP connection or an RTSP connection that is currently established with the receive end device. The receive end device changes the preemption capability of the receive end device to "support projection connection preemption" in response to the second configuration information. After successfully changing the preemption capability, the receive end device may send feedback information to the transmit end device, so as to notify the receive end device of a change result of the preemption capability. In addition, after successfully changing the preemption capability, the receive end device updates preemption capability information configured in the beacon frame or discovery packet, for example, updates the preemption capability information from "1" to "0", so that the transmit end device can also obtain, by using the beacon frame or discovery packet of the receive end device, the preemption capability changed by the receive end device. After determining that the preemption capability of the receive end device is successfully changed to "support projection connection preemption", the transmit end device refreshes the unlock button 357 on the display to the lock button 354.

Table 4 shows an implementable field format of the first configuration information and the second configuration information.

TABLE 4

| Attribute (attribute) | OUI (organizationally unique identifier) | Feature Id (feature ID) | Lock Information (lock information) |
|---|---|---|---|
| Value (value) | 0x00E0FC | 0x2 | 0: Unlock preemption 1: Lock preemption |

The value of the "lock information" in Table 4 being "1" corresponds to the first configuration information in this embodiment of this application, and the value of the "lock information" being "0" corresponds to the second configuration information in this embodiment of this application.

Further, if the user taps the projection mode button on the display, the projection mode of the transmit end device may be switched between the computer mode and the mobile phone mode. Specifically, if the current projection mode is the mobile phone mode, the instruction window includes the computer mode button 355 shown in FIG. 16. If the user taps the computer mode button 355, the transmit end device changes the projection mode to the computer mode, and refreshes the computer mode button 355 to the mobile phone mode button 351. If the current mode is the computer mode, the instruction window includes the mobile phone mode button 351 shown in FIG. 16. If the user taps the mobile phone mode button 351, the transmit end device changes the projection mode to the mobile phone mode, and refreshes the mobile phone mode button 351 to the computer mode button 355.

Further, if the user taps the input mode button on the display, the input mode of the transmit end device may be switched between a touchpad mode and a soft keyboard mode. Specifically, if the current input mode is the touchpad mode, the instruction window includes the soft keyboard mode button 356 shown in FIG. 16. If the user taps the soft keyboard mode button 356, the transmit end device changes the input mode to the soft keyboard mode, and refreshes the soft keyboard mode button 356 to the touchpad mode button 352. If the current projection mode is the soft keyboard mode, the instruction window includes the touchpad mode button 352 shown in FIG. 16. If the user taps the touchpad mode button 352, the transmit end device changes the input mode to the touchpad mode, and refreshes the touchpad mode button 352 to the soft keyboard mode button 356.

Further, as shown in FIG. 16, if the user taps the disconnect button 353 on the display, the transmit end device disconnects from the receive end device, and the projection connection ends.

With reference to an example, the following describes beneficial effects that can be implemented in the technical solution in Embodiment 1 of this application.

Figure 19:
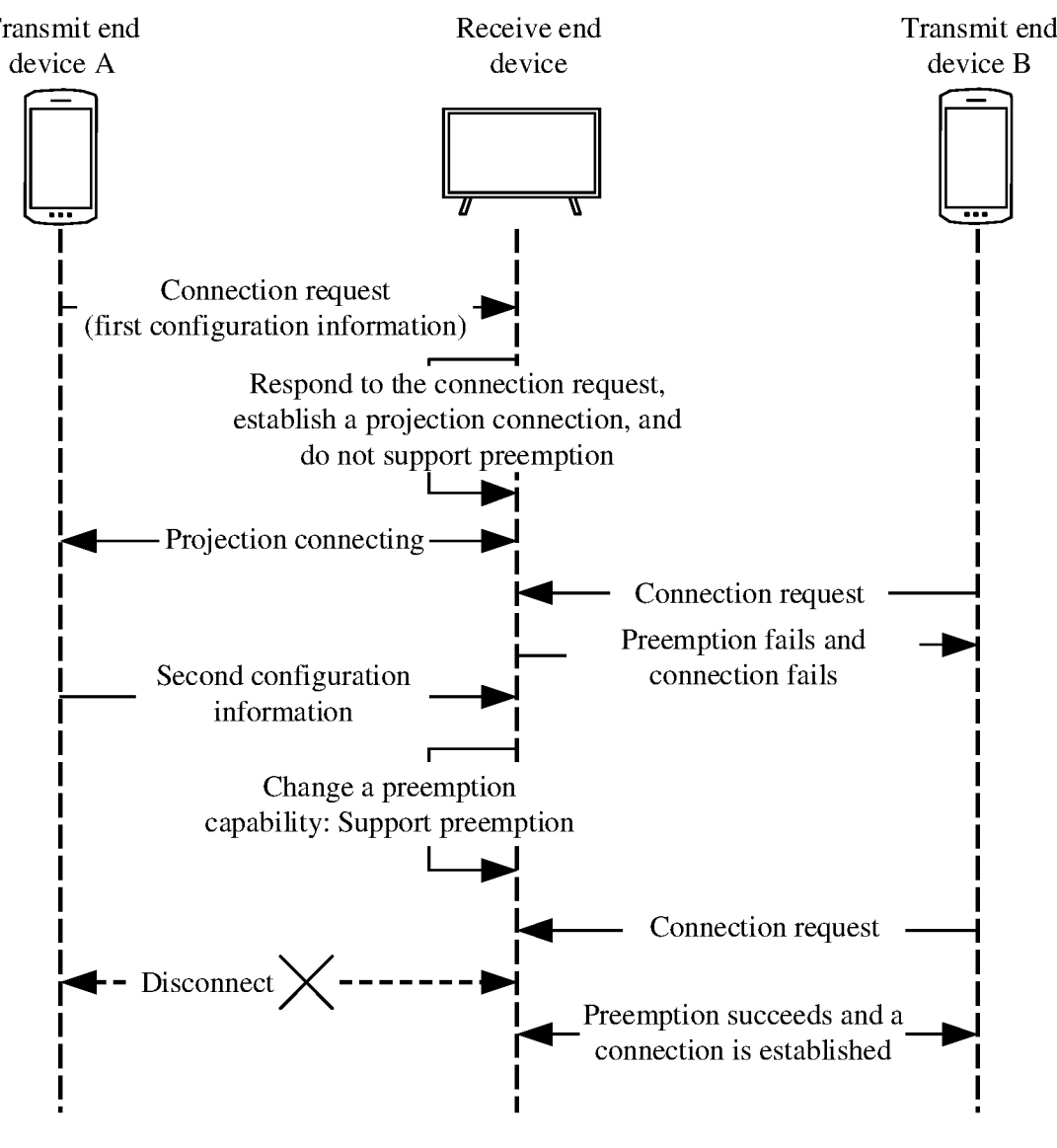
FIG. 19 is a schematic diagram of beneficial effects that can be implemented in the technical solutions according to embodiments of this application.

As shown in FIG. 19, a transmit end device A sends a connection request to a receive end device in an idle state. The connection request carries first configuration information. In response to the connection request, the receive end device establishes a projection connection to the transmit end device, and after the projection connection is successfully established, the receive end device configures the receive end device to not support projection connection preemption. After this, another transmit end device B discovers the receive end device, and sends a connection request to the receive end device B to attempt to preempt the receive end device. However, because the receive end device does not support projection connection preemption at this moment, the transmit end device B fails in preemption. Then, the transmit end device A sends second configuration information to the receive end device. In response to the second configuration information, the receive end device configures the receive end device to support projection connection preemption. After this, the transmit end device B sends a connection request to the receive end device again to attempt to preempt the receive end device. In this case, because the receive end device supports projection connection preemption, the receive end device disconnects from the transmit end device A and then establishes a projection connection to the transmit end device B, that is, the transmit end device B succeeds in preemption.

According to the technical solution provided in Embodiment 1 of this application, the receive end device notifies the transmit end device of the preemption capability of the receive end device, so that the transmit end device can dynamically configure the preemption capability of the receive end device based on the preemption capability of the receive end device and a user requirement. For example, if the user does not wish to preempt a projection connection, the transmit end device may configure the receive end device to not support preemption, so as to avoid interference or interruption of content that the user wishes to deliver on the receive end device. If the user has completed display of the content that needs to be delivered on the receive end device, the transmit end device may configure the receive end device to support preemption, so that another transmit end device can establish a connection to the transmit end device, so that different streaming media content from a plurality of transmit end devices can be switched seamlessly on one receive end device, thereby improving user experience.

Embodiment (2)

In Embodiment (2) of this application, a receive end device configures a preemption capability of the receive end device based on a device identifier of a transmit end device.

FIG. 20 is a flowchart in which a receive end device configures a preemption capability of the receive end device based on a device identifier of a transmit end device. As shown in FIG. 20, the procedure may include step S401 to step S4032.

Step S401: The receive end device obtains the device identifier of the transmit end device when receiving a connection request.

In specific implementation, the device identifier of the transmit end device may be a device name, a device number, an SSID, a MAC address, an IP address, a combination thereof, or the like of the transmit end device. The device name may be specifically a device type of the transmit end device, a manufacturer name, another user-defined name, or the like. It should be understood that an implementation of the device identifier is not specifically limited in this embodiment of this application, and any information that can enable a user to associate a receive end device displayed in a list of available devices with a real receive end device in reality can be used as a device identifier.

Step S402: The receive end device determines, based on the device identifier, a device group to which the transmit end device belongs.

The receive end device may configure a device list in advance. The device list may include at least one device group, and each device group includes at least one device identifier, so that the receive end device can determine, by searching the device list, the device group to which the receive end device belongs.

In an implementation, the device list is shown in Table 5, and may include at least a first device group and a second device group.

TABLE 5

| | First device group | Second device group |
|---|---|---|
| Device identifier | MAC address 1 | MAC address 6 |
| | MAC address 2 and MAC address 3 | MAC address 7 |
| | MAC address 4 | MAC address 8 and MAC address 9 |
| | MAC address 5 | MAC address 10 |
| | . . . | . . . |

For example, based on Table 5, if the MAC address of the transmit end device is the MAC address 1, the receive end device may determine that the transmit end device belongs to the first device group. If the MAC address of the transmit end device is the MAC address 5, the receive end device may determine that the transmit end device belongs to the second device group. If the MAC address of the transmit end device is the MAC address 2 or the MAC address 3, the receive end device may determine that the transmit end device belongs to the first device group. If the MAC address of the transmit end device is the MAC address 8 or the MAC address 9, the receive end device may determine that the transmit end device belongs to the second device group.

In an implementation, the device list is shown in Table 6, and may include only a first device group, to form a whitelist.

TABLE 6

| | First device group |
|---|---|
| Device identifier | Manufacturer 1 |
| | Manufacturer 2 |
| | Manufacturer 3 |
| | Manufacturer 4 |
| | . . . |

For example, based on Table 6, if the manufacturer of the transmit end device is the manufacturer 1, the receive end device may determine that the transmit end device belongs to the first device group. If the manufacturer of the transmit end device does not belong to any manufacturer in Table 6, the receive end device may determine that the transmit end device does not belong to the first device group.

In an implementation, the device list is shown in Table 7, and may not include the first device group to form a blacklist.

TABLE 7

| | Non-first device group |
|---|---|
| Device identifier | IP address 1 |
| | IP address 2 |
| | IP address 3 |
| | IP address 4 and IP address 5 |
| | . . . |

For example, based on Table 7, if the IP address of the transmit end device is the IP address 1, the receive end device may determine that the transmit end device does not belong to the first device group. If the IP address of the transmit end device is the IP address 4 or the IP address 5, the receive end device may determine that the transmit end device does not belong to the first device group. If the IP address of the transmit end device does not belong to any IP address in Table 7, the receive end device may determine that the transmit end device belongs to the first device group.

Step S4031: If the transmit end device belongs to the first device group, the receive end device configures the receive end device to not support projection connection preemption.

In specific implementation, when the receive end device currently supports projection connection preemption or is in an idle state, the receive end device establishes a projection connection to the transmit end device in response to the connection request of the transmit end device, and configures the receive end device to not support preemption, so as to prevent another transmit end device from causing interference to the current projection connection.

Step S4032: If the transmit end device does not belong to the first device group, the receive end device configures the receive end device to not support projection connection preemption.

In specific implementation, when the receive end device currently supports projection connection preemption, the receive end device establishes a projection connection to the transmit end device in response to the connection request of the transmit end device, and keeps supporting preemption, so that another transmit end device can initiate preemption on the projection connection. When the receive end device is in an idle state and does not support projection connection preemption, the receive end device establishes a projection connection to the transmit end device in response to the connection request of the transmit end device, and configures the receive end device to support preemption, so that another transmit end device can initiate projection connection preemption to this projection connection.

According to the technical solution provided in Embodiment (2) of this application, the receive end device may determine, by using a blacklist/whitelist mechanism, whether the transmit end device that initiates the connection request belongs to a group corresponding to the whitelist. If the transmit end device belongs to the group corresponding to the whitelist, the receive end device configures the receive end device to not support preemption, so that the projection connection between the transmit end device and the receive end device is not preempted or interfered with. If the transmit end device does not belong to the group corresponding to the whitelist, the receive end device configures the receive end device to support preemption, so that another transmit end device can reasonably initiate projection connection preemption, and different streaming media content from a plurality of transmit end devices can be switched seamlessly on one receive end device, thereby improving user experience.

Embodiment (3)

In some scenarios, one user may have a plurality of electronic devices, for example, at least one mobile phone and/or at least one notebook computer. Because of a demonstration requirement, the user may successively use the foregoing plurality of electronic devices as transmit end devices to project content on the receive end device. For example, in a time period of t0 to t1, the user uses a transmit end device A (for example, a mobile phone) to project content on the receive end device. In a time period of t1 to t2, the user uses a transmit end device B (for example, a notebook computer) to project content on the receive end device. In this case, if the transmit end device A sets the receive end device to not support connection preemption by using first configuration information in the time period of t0 to t1, the transmit end device B can only establish a projection connection to the receive end device after the transmit end device A disconnects from the receive end device. However, projection and preemption actions of both the transmit end device A and the transmit end device B are controlled through user instructions of a same user, which represent use requirements of the user. Therefore, even if the receive end device is configured to not support connection preemption, another transmit end device of the same user may be allowed to initiate projection preemption, so that projection connections of a plurality of transmit end devices of the same user to the receive end device can be switched seamlessly, thereby improving user experience.

FIG. 21 is a flowchart in which a receive end device allows transmit end devices of a same user to initiate projection preemption. As shown in FIG. 21, the procedure includes the following steps S501 to step S5042.

Step S501: A receive end device obtains user information of a transmit end device A from a connection request of the transmit end device A.

In specific implementation, the user information may be information such as a user name and/or a password used by a user to register with or log in to the electronic device. The user name may be a user-defined character string, and the character string may include, for example, one or more of a letter, a number, a Chinese character, or a symbol. In addition, the user name may be information such as a mailbox address or a mobile phone number used by the user to register with or log in to the electronic device. It should be understood that a specific implementation of the user name is not specifically limited in this embodiment of this application, and information that can be used to distinguish a user identity may be used as the user name.

In an implementation, the user information may include only a user name. Before the transmit end device A sends the connection request to the receive end device, the transmit end device A may calculate a hash value of the user name by using a hash function (hash function, also referred to as hash algorithm), and use the hash value of the user name as the user information, so as to implement encryption of the user name and protect user information security.

In another implementation, the user information may include a user name and a password. Before the transmit end device A sends the connection request to the receive end device, the transmit end device A may use a hash function to calculate a hash value of a character string including the user name and the password, and use the hash value as the user information, so as to implement encryption on the user name and the password, and protect user information security.

Further, the transmit end device A may configure the user information in the connection request, and send the connection request that includes the user information to the receive end device, so that the receive end device can obtain the user information from the connection request.

Step S502: When the receive end device and the transmit end device A have established a projection connection, and the receive end device is configured to not support connection preemption, if the receive end device receives a connection request from a transmit end device B, the receive end device obtains user information of the transmit end device B from the connection request of the transmit end device B.

In specific implementation, if the connection request sent by the transmit end device A to the receive end device further includes first configuration information, the receive end device sets the receive end device to not support connection preemption. In this case, if the receive end device receives a connection request from another transmit end device such as the transmit end device B, the receive end device attempts to obtain the user information of the transmit end device B from the connection request of the transmit end device B. If the user information of the transmit end device B can be obtained, step S503 is performed. If the user information of the transmit end device B cannot be obtained, the receive end device rejects the connection request of the transmit end device B.

In an implementation, when the user information includes only a user name, before the transmit end device B sends the connection request to the receive end device, a hash function may be used to calculate a hash value of the user name used by a user to register with or log in to the transmit end device B, and the hash value of the user name is used as the user information, thereby implementing encryption of the user information and protecting user information security.

In an implementation, when the user information includes a user name and a password, before the transmit end device B sends the connection request to the receive end device, a hash function may be used to calculate a hash value of a character string including the user name and the password that are used by the user to register with or log in to the transmit end device B, and the hash value is used as the user information, thereby implementing encryption of the user name and the password and protecting user information.

Further, the transmit end device B may configure the user information (that is, the hash value of the user name) in the connection request, and send the connection request that includes the user information to the receive end device, so that the receive end device can obtain the user information from the connection request.

Step S503: The receive end device determines whether the user information of the transmit end device A is the same as the user information of the transmit end device B.

Specifically, when the user information of the transmit end device A is the same as the user information of the transmit end device B, it indicates that the transmit end device A and the transmit end device B belong to a same user, and step S5041 is performed. When the user information of the transmit end device A is different from the user information of the transmit end device B, it indicates that the transmit end device A and the transmit end device B do not belong to a same user, and step S5042 is performed.

Step S5041: If the user information of the transmit end device A is the same as the user information of the transmit end device B, the receive end device releases the projection connection between the receive end device and the transmit end device A, and establishes a projection connection to the transmit end device B.

Step S5042: If the user information of the transmit end device A is the same as the user information of the transmit end device B, the receive end device rejects the connection request of the transmit end device B.

According to the foregoing method, in a case in which the receive end device has established the projection connection to the transmit end device A, if the projection connection request of the transmit end device B is received, the receive end device may determine whether the user information of the transmit end device A and that of the transmit end device B are the same. If the user information of the transmit end device A and that of the transmit end device B are the same, the transmit end device B is allowed to perform projection connection preemption, so as to implement seamless projection switching from the transmit end device A to the transmit end device B, thereby improving user experience.

Embodiment (4)

In some scenarios, after a user establishes a projection connection to a receive end device by using a transmit end device, and completes presentation, the projection connection may be disconnected for some reasons, and the transmit end device and the receive end device keep a projection connected state. For example, after the user completes projection presentation on a television by using a mobile phone, the user forgets to tap a disconnect button on a display of the mobile phone, and leaves the scene with the mobile phone. In this case, so long as a network connection can be established between the mobile phone and the television, the mobile phone keeps a projection connected state with the television. In this case, if the transmit end device has configured the receive end device to not support connection preemption, another transmit end device cannot establish a projection connection to the receive end device, which causes a waste of device resources and affects user experience.

To resolve this problem, Embodiment (4) of this application provides an aging mechanism for a projection connection. For example, the aging mechanism may include: The receive end device determines whether a displayed image projected by the transmit end device changes within a continuous time period greater than preset duration $\Delta T_0$. If the displayed image does not change, the receive end device releases the projection connection between the receive end device and the transmit end device.

Figure 22:
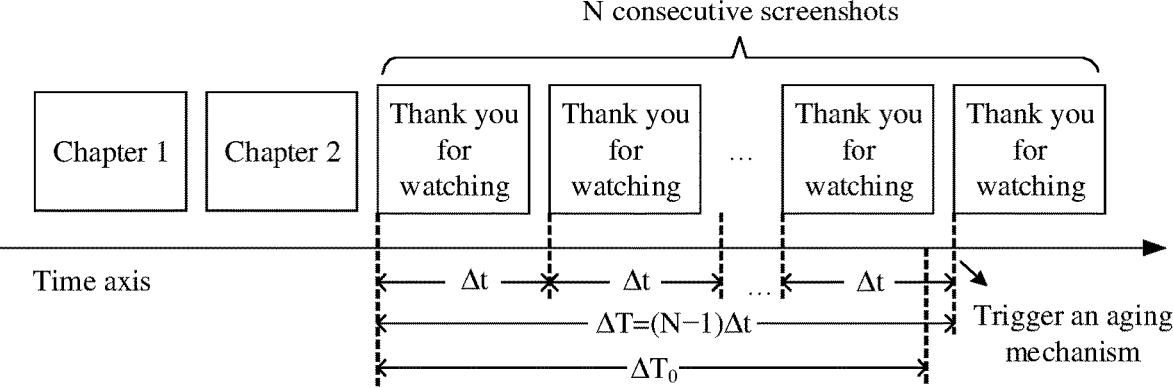
FIG. 22 is a schematic diagram of triggering an aging mechanism by a receive end device.

In specific implementation, as shown in FIG. 22, after the receive end device establishes a projection connection to the transmit end device, the receive end device may take, at an interval of a time period $\Delta t$, a screenshot on an image displayed on a display of the receive end device. Therefore, a time period spanned by N consecutive screenshots is $\Delta T=(N-1)\ \Delta t$. Based on the foregoing screenshots, the receive end device determines whether content of the consecutive N screenshots are the same to enable $\Delta T$ to be greater than $\Delta T_0$. If the content is the same, it indicates that the displayed image projected by the transmit end device does not change in a continuous period greater than $\Delta T_0$.

For example, comparing whether the content of the N consecutive screenshots is the same may be implemented in any one of the following manners. For example, the receive end device may compare whether the content of the N screenshots is the same by using a grayscale-based image matching algorithm. The grayscale-based image matching algorithm is, for example, a mean absolute differences (mean absolute differences, MAD) algorithm, a sum of absolute differences (sum of absolute differences, SAD) algorithm, a sum of squared differences (sum of squared differences, SSD) algorithm, and a mean square differences (mean square differences, MSD) algorithm. For another example, the receive end device may alternatively use an image matching model based on a deep neural network, such as a convolutional neural network (convolutional neural network, CNN). It should be noted herein that technical content of image matching for determining whether the content of the N consecutive screenshots is the same is not mainly discussed in this embodiment of this application. A person skilled in the art may implement, by using various image matching technologies that can be implemented currently, the comparing whether the content of the N consecutive screenshots is the same in this embodiment of this application.

According to the foregoing method, when the receive end device determines that the displayed image projected by the transmit end device does not change within a continuous time period greater than the preset duration, it is considered that the receive end device has completed the projection task and the user forgets to release the projection connection. Therefore, the receive end device disconnects from the transmit end device, so that another transmit end device can be connected, a device resource waste is avoided, and user experience is improved.

Embodiment (5)

In Embodiment (5) of this application, a receive end device may independently configure a preemption capability of the receive end device, and does not need to interact with a transmit end device.

Figure 23:
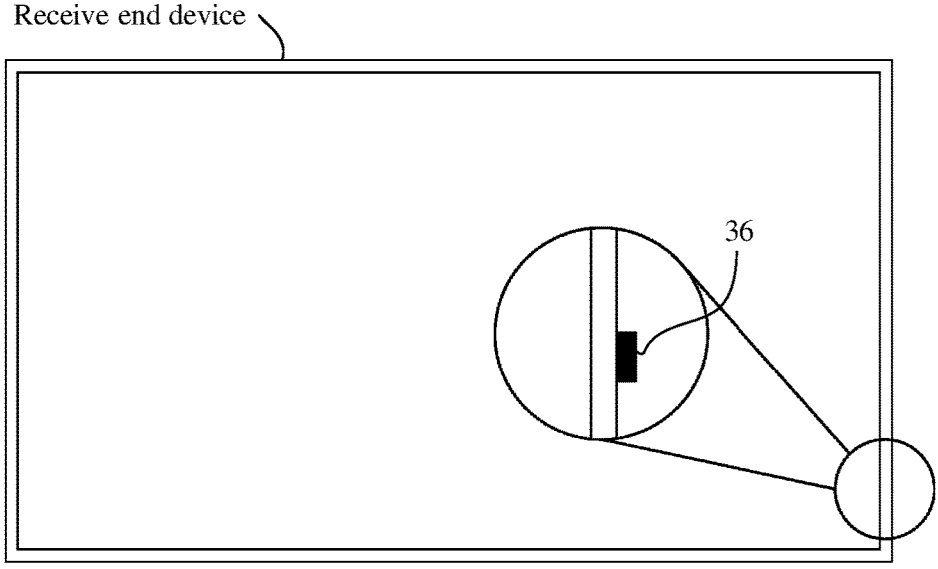
FIG. 23 is a schematic diagram of a receive end device.

FIG. 23 is a schematic diagram of a receive end device. As shown in FIG. 23, a button 36 used to configure a preemption capability is disposed on a body of the receive end device. A user may press the button 36 to implement switching between different preemption capabilities of the receive end device. For example, when the receive end device currently supports projection connection preemption, if the user presses the button 36, the receive end device configures the receive end device to not support projection connection preemption. When the receive end device currently does not support projection connection preemption, if the user presses the button 36, the receive end device configures the receive end device to support projection connection preemption.

FIG. 24 is a schematic diagram of controlling a receive end device by using a remote control device. As shown in FIG. 24, the remote control device may be a paired remote control 37 of the receive end device or a remote control simulated by using an electronic device such as a mobile phone. In an implementation, the remote control may be provided with a button 38 used to configure a preemption capability. The user may implement switching of the receive end device between different preemption capabilities by pressing the button 38, for example, switching from supporting projection connection preemption to not supporting projection connection preemption, and from not supporting projection connection preemption to supporting projection connection preemption. In another implementation, the user may open a setting menu 39 of the receive end device by operating the remote controller 37, and an option 391 of whether to support projection connection preemption may be added to the setting menu 39 of the receive end device. The user may set the option to "Yes" or "No" by using the remote controller 37, so as to configure the preemption capability of the receive end device.

According to the technical solution in Embodiment (5) of this application, the user can flexibly configure the preemption capability of the receive end device by using a button on the receive end device or a remote control based on a requirement, so as to improve user experience.

In the foregoing embodiments provided in this application, the solutions of the projection connection control method provided in this application are described in terms of the device itself and interaction between devices. It may be understood that, to implement the foregoing functions, each electronic device, such as the foregoing transmit end device and the foregoing receive end device, includes a hardware structure and/or a software module corresponding to each function. A person skilled in the art should readily recognize that, with reference to the examples described in the embodiments disclosed in this specification, the units and algorithm steps may be implemented in a form of hardware or a combination of hardware and computer software. Whether a function is executed in a hardware or computer software-driven hardware manner depends on a specific application and design constraint condition of a technical solution. A person skilled in the art may use different methods for each specific application to implement the described functions, but this implementation should not be considered to be beyond the scope of this application.

For example, the foregoing electronic device implements a corresponding function by using a software module.

In an embodiment, as shown in FIG. 25, an electronic device configured to implement the foregoing functions of behavior of the transmit end device includes: an obtaining module 501, configured to obtain preemption capability information of a receive end device, where the preemption capability information indicates whether the receive end device supports projection connection preemption; a send-ing module 502, configured to: when the receive end device supports projection connection preemption, send first configuration information to the receive end device in response to a user instruction, where the first configuration information indicates the receive end device to configure the receive end device to not support projection connection preemption.

In this way, the transmit end device can obtain a preemption capability of the receive end device, so that the transmit end device can dynamically configure the preemption capability of the receive end device based on the preemption capability of the receive end device and a user requirement. For example, if the user does not want a projection connection to be preempted, the transmit end device may configure the receive end device to not support preemption, so as to avoid interference or interruption of content that the user wishes to deliver on the receive end device. Therefore, the method provided in this embodiment of this application optimizes a preemption logic of a streaming media projection scenario, and improves user experience.

Optionally, the sending module 502 is specifically configured to send a connection request to the receive end device in response to a first user instruction. The connection request is used by the transmit end device to establish a projection connection to the receive end device, and the connection request carries the first configuration information. In this way, when the receive end device supports projection connection preemption, the transmit end device may configure the receive end device to not support preemption while sending the connection request to the receive end device, so that any subsequent request for projection connection preemption will be rejected by the receive end device, thereby avoiding interference or interruption of content delivered by the user on the receive end device, and improving user experience.

Optionally, the sending module 502 is specifically configured to send the first configuration information to the receive end device in response to a second user instruction when the transmit end device establishes a projection connection to the receive end device. In this way, when the receive end device supports projection connection preemption, the transmit end device may configure, at any time, the receive end device to not support preemption after establishing the projection connection to the receive end device, so that any subsequent request for projection connection preemption will be rejected by the receive end device, thereby avoiding interference or interruption of content delivered by the user on the receive end device, and improving user experience.

Optionally, the sending module 502 is further configured to: when the receive end device does not support projection connection preemption, send second configuration information to the receive end device in response to a third user instruction. The second configuration information indicates the receive end device to configure the receive end device to support projection connection preemption. In this way, if the content that the user needs to deliver has already displayed on the receive end device, the transmit end device may configure the receive end device to support preemption, so that another transmit end device can establish a connection to the transmit end device, and different streaming media content from a plurality of transmit end devices can be switched seamlessly on one receive end device, thereby improving user experience.

Optionally, the obtaining module 501 is specifically configured to receive a beacon frame broadcast by the receive end device. The beacon frame carries the preemption capability information. In this way, in a device discovery stage, the transmit end device may obtain the preemption capability information from the beacon frame of the receive end device, and display the preemption capability information to the user, so as to instruct the user to send a corresponding instruction, thereby improving user experience.

Optionally, the sending module 502 is specifically configured to send a probe request to the receive end device. The obtaining module 501 is configured to receive a probe response of the receive end device. The probe response is sent by the receive end device in response to the probe request, and the probe response carries the preemption capability information. In this way, in the device discovery stage, the transmit end device may obtain the preemption capability information from the probe response of the receive end device, and display the preemption capability information to the user, so as to instruct the user to send a corresponding instruction, thereby improving user experience.

Optionally, the obtaining module 501 is specifically configured to receive a discovery packet broadcast or multicast by an access point device. The discovery packet is sent by the receive end device to the access point device, and the discovery packet carries the preemption capability information. In this way, in the device discovery stage, the transmit end device may obtain the preemption capability information from the discovery packet of the receive end device, and display the preemption capability information to the user, so as to instruct the user to send a corresponding instruction, thereby improving user experience.

Optionally, the obtaining module 501 is further configured to obtain connection status information of the receive end device. The connection status information indicates whether a projection connection is currently established by the receive end device. In this way, the transmit end device may display the connection status of the receive end device to the user, so as to instruct the user to send a corresponding instruction, thereby improving user experience.

Figure 26:
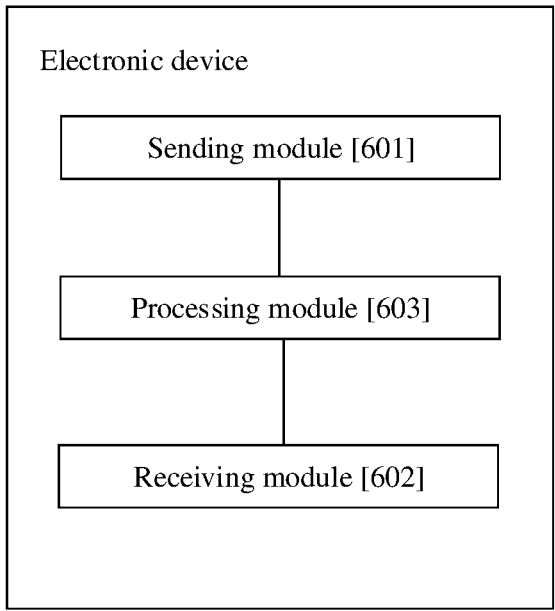
FIG. 26 is a schematic diagram of modules of an electronic device according to an embodiment of this application.

In an embodiment, as shown in FIG. 26, an electronic device configured to implement the foregoing functions of behavior of the receive end device includes: a sending module 601, configured to send preemption capability information to a transmit end device, where the preemption capability information indicates whether the receive end device supports projection connection preemption; a receiving module 602, configured to receive first configuration information of the transmit end device, where the first configuration information is sent in response to a user instruction when the transmit end device determines, based on the preemption capability information, that the receive end device supports projection connection preemption; and a processing module 603, configured to configure, based on the first configuration information, the receive end device to not support projection connection preemption.

In this way, the receive end device may notify the transmit end device of a preemption capability of the receive end device, so that the transmit end device can dynamically configure the preemption capability of the receive end device based on the preemption capability of the receive end device and a user requirement. For example, if the user does not want a projection connection to be preempted, the transmit end device may configure the receive end device to not support preemption, so as to avoid interference or interruption of content that the user wishes to deliver on the receive end device. Therefore, the method provided in this embodiment of this application optimizes a preemption logic of a streaming media projection scenario, and improves user experience.

Optionally, the receiving module 602 is specifically configured to receive a connection request from the transmit end device. The connection request is sent by the transmit end device in response to a first user instruction, and the connection request carries the first configuration information.

Optionally, the processing module 603 is specifically configured to: when the receive end device supports projection connection preemption, establish a projection connection to the transmit end device in response to the connection request, and configure, based on the first configuration information, the receive end device to not support projection connection preemption.

In this way, when the receive end device supports projection connection preemption, the transmit end device may configure the receive end device to not support preemption while sending the connection request to the receive end device, so that any subsequent request for projection connection preemption will be rejected by the receive end device, thereby avoiding interference or interruption of content delivered by the user on the receive end device, and improving user experience.

Optionally, the receiving module 602 is specifically configured to: when the transmit end device and the receive end device have established a projection connection, receive the first configuration information sent by the transmit end device in response to a second user instruction. In this way, when the receive end device supports projection connection preemption, the transmit end device may configure, at any time, the receive end device to not support preemption after establishing the projection connection to the receive end device, so that any subsequent request for projection connection preemption will be rejected by the receive end device, thereby avoiding interference or interruption of content delivered by the user on the receive end device, and improving user experience.

Optionally, the receiving module 602 is further configured to receive second configuration information from the transmit end device. The second configuration information is sent by the transmit end device in response to a third user instruction when the transmit end device and the receive end device have established a projection connection. The processing module 603 is further configured to configure, based on the second configuration information, the receive end device to support projection connection preemption. In this way, if the content that the user needs to deliver has already displayed on the receive end device, the transmit end device may configure the receive end device to support preemption, so that another transmit end device can establish a connection to the transmit end device, and different streaming media content from a plurality of transmit end devices can be switched seamlessly on one receive end device, thereby improving user experience.

Optionally, the sending module 601 is specifically configured to broadcast a beacon frame to the transmit end device, where the beacon frame carries the preemption capability information. In this way, in a device discovery stage, the transmit end device may obtain the preemption capability information from the beacon frame of the receive end device, and display the preemption capability information to the user, so as to instruct the user to send a corresponding instruction, thereby improving user experience.

Optionally, the receiving module 602 is specifically configured to receive a probe request from the transmit end device. The sending module 601 is specifically configured to send a probe response to the transmit end device in response to the probe request, where the probe response carries the preemption capability information. In this way, in the device discovery stage, the transmit end device may obtain the preemption capability information from the probe response of the receive end device, and display the preemption capability information to the user, so as to instruct the user to send a corresponding instruction, thereby improving user experience.

Optionally, the sending module 601 is specifically configured to send a discovery packet to an access point device, so that the access point device broadcasts or multicast the discovery packet to the transmit end device, where the discovery packet carries the preemption capability information. In this way, in the device discovery stage, the transmit end device may obtain the preemption capability information from the discovery packet of the receive end device, and display the preemption capability information to the user, so as to instruct the user to send a corresponding instruction, thereby improving user experience.

Optionally, the sending module 601 is further configured to send connection status information to the transmit end device, where the connection status information indicates whether a projection connection is currently established by the receive end device. In this way, the transmit end device may display the connection status of the receive end device to the user, so as to instruct the user to send a corresponding instruction, thereby improving user experience.

Optionally, the processing module 603 is further configured to: when receiving the connection request, obtain a device identifier of the transmit end device; determine, based on the device identifier, a device group to which the transmit end device belongs; and if the transmit end device belongs to a first device group, configure the receive end device to not support projection connection preemption; or if the transmit end device does not belong to the first device group, configure the receive end device to support projection connection preemption. In this way, the receive end device may determine, by using a blacklist/whitelist mechanism, whether the transmit end device that initiates the connection request belongs to a group corresponding to the whitelist. If the transmit end device belongs to the group corresponding to the whitelist, the receive end device configures the receive end device to not support preemption, so that the projection connection between the transmit end device and the receive end device is not preempted or interfered with. If the transmit end device does not belong to the group corresponding to the whitelist, the receive end device configures the receive end device to support preemption, so that another transmit end device can reasonably initiate projection connection preemption, and different streaming media content from a plurality of transmit end devices can be switched seamlessly on one receive end device, thereby improving user experience.

In addition, the foregoing electronic device implements a corresponding function by using a hardware module.

In an embodiment, the functions of the transmit end device and the receive end device may be implemented with reference to the electronic device in FIG. 5. The electronic device may include, for example, a display (such as a touchscreen or a non-touch screen), a memory, and one or more processors. The display, the memory, and the processor are coupled. The memory is configured to store computer program code, and the computer program code includes computer instructions. When the processor executes the computer instructions, the electronic device may execute functions or steps executed by the transmit end device or the receive end device in the foregoing method embodiments.

Figure 27:
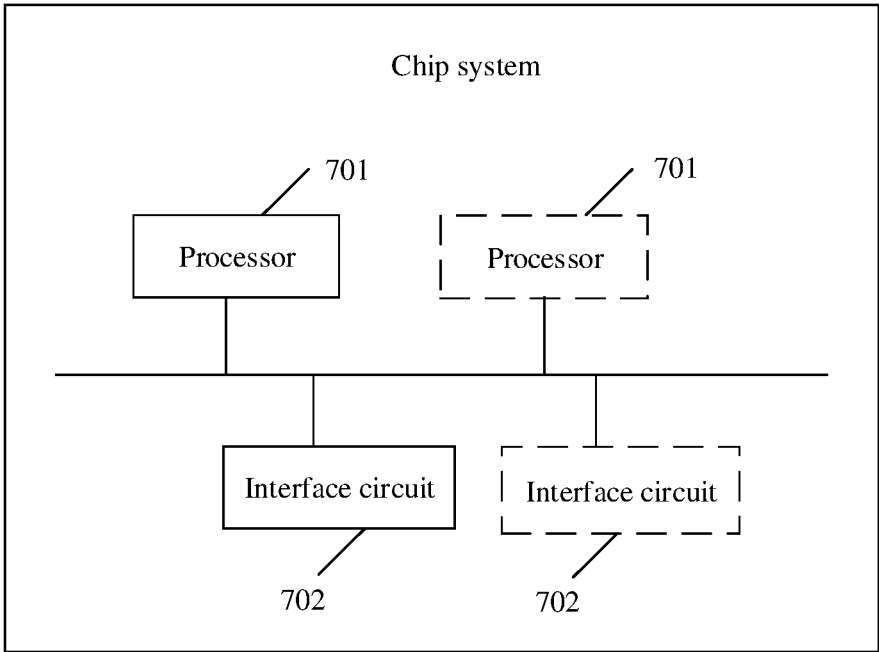
FIG. 27 is a schematic diagram of a chip system according to an embodiment of this application.

The embodiments of this application further provide a chip system. As shown in FIG. 27, the chip system includes at least one processor 701 and at least one interface circuit 702. The processor 701 and the interface circuit 702 may be interconnected through a line. For example, the interface circuit 702 may be configured to receive a signal from another apparatus (for example, a memory of an electronic device). For another example, the interface circuit 702 may be configured to send a signal to another apparatus (for example, the processor 701 or a touchscreen of an electronic device). For example, the interface circuit 702 may read instructions stored in the memory, and send the instructions to the processor 701. When the instructions are executed by the processor 701, the electronic device can perform steps in the foregoing embodiments. Certainly, the chip system may further include another discrete component. This is not specifically limited in this embodiment of this application.

The embodiments of this application further provide a computer storage medium. The computer storage medium includes computer instructions. When the computer instructions are run on the foregoing electronic device, the electronic device performs functions or steps executed by the electronic device in the foregoing method embodiments.

The embodiments of this application further provide a computer program product. When the computer program product runs on a computer, the computer is enabled to execute functions or steps executed by the electronic device in the foregoing method embodiments.

It may be clearly understood by a person skilled in the art from the foregoing description of the implementations that, for convenience and brevity of the description, division of the foregoing functional modules is merely used as an example for description. In actual application, the foregoing functions may be allocated to different functional modules based on a requirement, that is, an internal structure of the apparatus is divided into different functional modules, so as to complete all or some of the functions described above.

It is easy to understand that, on the basis of the embodiments provided in this application, a person skilled in the art may combine, split, reorganize the embodiments of this application to obtain another embodiment, and none of these embodiments exceeds the protection scope of this application.

In the embodiments provided in this application, it should be understood that the disclosed devices and methods may be implemented in another manner. For example, the described device embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may be one physical unit or may be a plurality of physical units, may be located at one position, or may be distributed on a plurality of different places. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit. The foregoing integrated unit may be implemented in a form of hardware, or may be implemented in a form of a software functional unit.

When an integrated unit is implemented in a form of a software functional unit and sold or used as an independent product, the integrated unit may be stored in a readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a device (which may be a single-chip processor, a chip, or the like) or a processor (processor) to perform all or some of the steps of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A projection connection control method, comprising:

sending, by a receive end device, preemption capability information to a transmit end device, wherein the preemption capability information indicates whether the receive end device supports projection connection preemption;

receiving, by the receive end device, first configuration information from the transmit end device, wherein the first configuration information is sent in response to a user instruction when the transmit end device determines, based on the preemption capability information, that the receive end device supports projection connection preemption, wherein receiving, by the receive end device, the first configuration information from the transmit end device comprises receiving, by the receive end device, a connection request of the transmit end device, wherein the connection request is sent by the transmit end device in response to the user instruction, and the connection request carries the first configuration information; and configuring, by the receive end device based on the first configuration information, the receive end device to stop supporting projection connection preemption, wherein configuring, by the receive end device based on the first configuration information, the receive end device to stop supporting projection connection preemption comprises:

when the receive end device supports projection connection preemption, establishing, by the receive end device, a projection connection with the transmit end device in response to the connection request, and configuring, based on the first configuration information, the receive end device to stop supporting projection connection preemption.

2. The method according to claim 1, wherein sending, by the receive end device, the preemption capability information to the transmit end device comprises:

broadcasting, by the receive end device, a beacon frame to the transmit end device, wherein the beacon frame carries the preemption capability information.

3. The method according to claim 1, wherein sending, by the receive end device, the preemption capability information to the transmit end device comprises:

receiving, by the receive end device, a probe request frame from the transmit end device; and sending, by the receive end device, a probe response frame to the transmit end device in response to the probe request frame, wherein the probe response frame carries the preemption capability information.

4. The method according to claim 1, wherein sending, by the receive end device, the preemption capability information to the transmit end device comprises:

sending, by the receive end device, a discovery packet to an access point device, wherein the access point device broadcasts or multicasts the discovery packet to the transmit end device, and wherein the discovery packet carries the preemption capability information.

5. The method according to claim 1, wherein the method further comprises:

sending, by the receive end device, connection status information to the transmit end device, wherein the connection status information indicates whether a projection connection is currently established by the receive end device.

6. An electronic device, comprising:

a display, a memory, and one or more processors, wherein the display, the memory, and the one or more processors are coupled, the memory stores computer program code, and the computer program code includes computer instructions, and when the one or more processors execute the computer instructions, the electronic device is caused to perform the following operations:

sending preemption capability information to a transmit end device, wherein the preemption capability information indicates whether the electronic device supports projection connection preemption;

receiving first configuration information from the transmit end device, wherein the first configuration information is sent in response to a user instruction when the transmit end device determines, based on the preemption capability information, that the electronic device supports projection connection preemption, wherein receiving the first configuration information from the transmit end device comprises receiving a connection request of the transmit end device, wherein the connection request is sent by the transmit end device in response to the user instruction, and the connection request carries the first configuration information; and configuring, based on the first configuration information, the electronic device to stop supporting projection connection preemption, wherein configuring, based on the first configuration information, the electronic device to stop supporting projection connection preemption comprises:

when the electronic device supports projection connection preemption, establishing a projection connection with the transmit end device in response to the connection request, and configuring, based on the first configuration information, the electronic device to stop supporting projection connection preemption.

7. The electronic device according to claim 6, wherein sending the preemption capability information to the transmit end device comprises:

broadcasting a beacon frame to the transmit end device, wherein the beacon frame carries the preemption capability information.

8. The electronic device according to claim 6, wherein sending the preemption capability information to the transmit end device comprises:

receiving a probe request frame from the transmit end device; and sending a probe response frame to the transmit end device in response to the probe request frame, wherein the probe response frame carries the preemption capability information.

9. The electronic device according to claim 6, wherein sending the preemption capability information to the transmit end device comprises:

sending a discovery packet to an access point device, wherein the access point device broadcasts or multicasts the discovery packet to the transmit end device, and wherein the discovery packet carries the preemption capability information.

10. The electronic device according to claim 6, wherein when the one or more processors execute the computer instructions, the electronic device is caused to perform the following further operations:

sending connection status information to the transmit end device, wherein the connection status information indicates whether a projection connection is currently established by the electronic device.

11. A system, comprising:

a receive end device, configured to:

send preemption capability information to a transmit end device, wherein the preemption capability information indicates whether the receive end device supports projection connection preemption; and the transmit end device, configured to:

when the transmit end device determines, based on the preemption capability information, that the receive end device supports projection connection preemption, and in response to a user instruction, send a connection request of the transmit end device to the receive end device, wherein the connection request of the transmit end device comprises first configuration information;

wherein the receive end device is further configured to:

receive the first configuration information from the transmit end device; and configure, based on the first configuration information, the receive end device to stop supporting projection connection preemption, wherein configuring, based on the first configuration information, the receive end device to stop supporting projection connection preemption comprises:

when the receive end device supports projection connection preemption, establishing, by the receive end device, a projection connection with the transmit end device in response to the connection request, and configuring, based on the first configuration information, the receive end device to stop supporting projection connection preemption.

12. The system according to claim 11, wherein the receive end device being configured to send the preemption capability information to the transmit end device comprises the receive end device being configured to:

broadcast a beacon frame to the transmit end device, wherein the beacon frame carries the preemption capability information.

13. The system according to claim 11, wherein the receive end device being configured to send the preemption capability information to the transmit end device comprises the receive end device being configured to:

receive a probe request frame from the transmit end device; and send a probe response frame to the transmit end device in response to the probe request frame, wherein the probe response frame carries the preemption capability information.

14. The system according to claim 11, wherein the receive end device being configured to send the preemption capability information to the transmit end device comprises the receive end device being configured to:

send a discovery packet to an access point device, wherein the access point device broadcasts or multicasts the discovery packet to the transmit end device, and wherein the discovery packet carries the preemption capability information.

15. The system according to claim 11, wherein the receive end device is further configured to:

send connection status information to the transmit end device, wherein the connection status information indicates whether a projection connection is currently established by the receive end device.

16. The system according to claim 11, wherein the transmit end device is further configured to:

obtain connection status information of the receive end device, wherein the connection status information indicates whether a projection connection is currently established by the receive end device.

17. The system according to claim 11, wherein the transmit end device and the receive end device are in wireless communication.

18. The system according to claim 11, wherein the transmit end device and the receive end device communicate using an access point device.

19. The system according to claim 11, wherein the receive end device is configured to send the preemption capability information to the transmit end device during a device discovery stage.

20. The system according to claim 11, wherein the receive end device is configured to periodically broadcast a beacon comprising the preemption capability information.

* * * * *